(12) United States Patent
Kagawa et al.

(10) Patent No.: US 6,985,979 B2
(45) Date of Patent: Jan. 10, 2006

(54) DIGITAL DATA PROCESSING DEVICE, BUS CONTROLLING METHOD, BUS CONTROLLING PROGRAM AND RECORDING MEDIUM

(75) Inventors: Tetsuo Kagawa, Hiroshima (JP); Hiroshi Matsuuchi, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 182 days.

(21) Appl. No.: 10/318,265

(22) Filed: Dec. 13, 2002

(65) Prior Publication Data

US 2003/0115389 A1    Jun. 19, 2003

(30) Foreign Application Priority Data

Dec. 17, 2001    (JP) .............................. 2001-382578

(51) Int. Cl.
    G06F 13/00    (2006.01)
(52) U.S. Cl. ........................ 710/100; 710/32; 710/107; 709/227
(58) Field of Classification Search ..............................
    340/825.24–825.25, 825.5–825.51; 700/19,
    700/22; 709/227; 714/18, 23, 43, 56; 710/32,
    710/40–45, 58, 61, 100, 107, 220, 305; 370/431,
    370/442, 449, 451, 457–458, 464, 477; 725/74,
    725/78, 80, 86–90, 98, 135, 138–153
    See application file for complete search history.

(56) References Cited

U.S. PATENT DOCUMENTS

| | | | | |
|---|---|---|---|---|
| 5,535,208 A | * | 7/1996 | Kawakami et al. | 370/391 |
| 5,689,244 A | * | 11/1997 | Iijima et al. | 340/3.9 |
| 5,828,656 A | * | 10/1998 | Sato et al. | 370/254 |
| 5,867,160 A | * | 2/1999 | Kraft et al. | 715/803 |
| 5,883,621 A | * | 3/1999 | Iwamura | 725/37 |
| 5,949,761 A | * | 9/1999 | Matsuno et al. | 370/254 |
| 6,078,783 A | * | 6/2000 | Kawamura et al. | 725/120 |
| 6,128,316 A | * | 10/2000 | Takeda et al. | 370/468 |
| 6,185,581 B1 | * | 2/2001 | Garthwaite | 707/206 |
| 6,226,697 B1 | * | 5/2001 | Tokuhiro | 710/36 |
| 6,282,597 B1 | * | 8/2001 | Kawamura | 710/105 |
| 6,286,071 B1 | * | 9/2001 | Iijima | 710/124 |
| 6,334,161 B1 | * | 12/2001 | Suzuki et al. | 710/29 |
| 6,389,496 B1 | * | 5/2002 | Matsuda | 710/316 |

(Continued)

FOREIGN PATENT DOCUMENTS

EP    957608 A2  *  11/1999

(Continued)

OTHER PUBLICATIONS

JVC; "1394 Interface Implementation Guideline for D-VHS"; JVC; May 29, 2000; revision 1.00.*

(Continued)

Primary Examiner—Paul R. Myers
Assistant Examiner—Ryan Stiglic
(74) Attorney, Agent, or Firm—McDermott Will & Emery LLP

(57) ABSTRACT

It is an object to restore states of isochronous resources and logic plugs to normal states when failures occur in release of the isochronous resources and disconnection of the logic plugs. Information of isochronous resources and logic plugs of which release have been failed is managed as a table, a disconnection processing for connections is repeated till the connections are disconnected according to the table, and when disconnection cannot be effected even after repetition of a disconnection processing, a bus reset is generated to restore the bus to a normal state.

10 Claims, 21 Drawing Sheets

U.S. PATENT DOCUMENTS

| | | | |
|---|---|---|---|
| 6,512,767 B1 * | 1/2003 | Takeda et al. | 370/389 |
| 6,519,544 B1 * | 2/2003 | Deguchi et al. | 702/117 |
| 6,574,755 B1 * | 6/2003 | Seon | 714/56 |
| 6,587,901 B2 * | 7/2003 | Nishikawa et al. | 710/100 |
| 6,591,313 B1 * | 7/2003 | Hata et al. | 710/33 |
| 6,603,737 B1 * | 8/2003 | Fukunaga et al. | 370/229 |
| 6,631,415 B1 * | 10/2003 | James et al. | 709/227 |
| 6,665,719 B1 * | 12/2003 | Isoda | 709/227 |
| 6,684,110 B1 * | 1/2004 | Kutsuna et al. | 700/17 |
| 6,721,831 B1 * | 4/2004 | Lee | 710/105 |
| 6,728,821 B1 * | 4/2004 | James et al. | 710/306 |
| 6,732,262 B1 * | 5/2004 | Sakai | 713/1 |
| 6,738,816 B1 * | 5/2004 | Momona | 709/226 |
| 6,742,134 B1 * | 5/2004 | Pothier et al. | 714/4 |
| 6,772,354 B2 * | 8/2004 | Takenaka et al. | 713/310 |
| 6,775,714 B1 * | 8/2004 | Miyano | 710/8 |
| 6,789,208 B2 * | 9/2004 | Noda et al. | 713/323 |
| 2001/0007118 A1 * | 7/2001 | Matsuda | 710/129 |
| 2002/0047862 A1 * | 4/2002 | Aoki et al. | 345/736 |
| 2002/0066015 A1 * | 5/2002 | Iwamoto | 713/168 |
| 2002/0099967 A1 * | 7/2002 | Kawaguchi | 713/323 |
| 2003/0066083 A1 * | 4/2003 | Hata et al. | 725/80 |

FOREIGN PATENT DOCUMENTS

| | | | |
|---|---|---|---|
| JP | 10275060 A | * | 10/1998 |
| JP | 11205363 A | * | 7/1999 |
| JP | 2001-103085 | | 4/2001 |

OTHER PUBLICATIONS

1394 Trade Association; "TA Doccument 1999031 AV/C Connection and Compatibility Management Specification 1.0"; 1394 Trade Association; Jul. 10, 2000.*

* cited by examiner

FIG. 18  PRIOR ART

| 0 | 1 | 2 | ... | | | ...29 | 30 | 31 | CHANNELS |
|---|---|---|-----|---|---|------|----|----|----------|
| 0 | 1 | 0 | ... | | | ... | 1 | 1 | 1 |

| 32 | 33 | 34 | ... | | | ...61 | 62 | 63 | CHANNELS |
|----|----|----|-----|---|---|------|----|----|----------|
| 0 | 0 | 0 | ... | | | ... | 0 | 1 | 1 |

FIG. 19 PRIOR ART

| reserved | bw_remaining (unused) |
|---|---|

DIGITAL DATA PROCESSING DEVICE, BUS CONTROLLING METHOD, BUS CONTROLLING PROGRAM AND RECORDING MEDIUM

BACKGROUND OF THE INVENTION

1. Field of the Invention

The present invention relates to a digital data processing device, and more particularly to a digital data processing device controlling input/output of data.

2. Prior Art of the Invention

Attention has been focused on IEEE 1394 serial bus interface standard advocated by IEEE (The Institute of Electrical and Electronics Engineers, Inc.) as an interface standard for transferring data at a high speed between home digital data processing devices and computers. As to features of the interface standard, there are cited: an aspect of enabling a high transfer speed of hundreds of M bits/sec to be realized, an aspect of supporting taking-out from/insertion into an active line and a high flexibility in connection form and others, and among them, the greatest feature is in an isochronous transfer. That is, an isochronous transfer is a synchronous data transfer and a transfer suitable for reproducing data, while receiving, that would have difficulty if being interrupted during the reproduction, such as a video and a speech (such data is hereinafter referred to a "isochronous stream").

Description will be given of a technique (mainly the contents defined in IEC 61883-1) inputting-outputting an isochronous stream between a plurality of digital data controlling devices connected to a serial bus in conformity with the IEEE 1394 serial interface standard (hereinafter referred to as a "1394 bus") below.

A case is considered, for example, that, as shown in FIG. 14, a plurality of digital data controlling devices, such as a digital TV 100, D-VHS 200, a digital video camera, a MD player, which latter two are not shown in the figure, and others, are currently connected to a 1394 bus.

A user at first depresses a recording button of a remote controller 101 for the digital TV 100 when the user wishes to record a program data (for example, audio data compressed by a method in conformity with MPEG) received by the digital TV 100 with the D-VHS 200. Then, the user successively inputs a broadcast channel for the program using a ten-key pad or the like of the remote controller 101. Then, the name of a digital data processing device currently connected to the 1394 bus is displayed on a screen of the remote controller 101 and here, the user selects a region in which the D-VHS 200 is displayed with a cursor key or the like.

The broadcast channel inputted to the remote controller 101 and the device name of the D-VHS 200 are allocated by an image recording application 102 installed on the digital TV 100 shown in FIG. 15 (hereinafter referred to as an "image recording application"). When having allocated the names of the digital TV 100 and the D-VHS 200, the image recording application 102 further allocates node IDs of the digital TV 100 and the D-VHS 200 with reference to a node ID table, not shown, on which the device name of a digital data processing device and the ID of the digital data processing device on the 1394 bus (hereinafter referred to a "node ID") are related to each other.

The image recording application 102, when having allocated the node IDs, proceeds to a processing to establish a virtual connection (hereinafter simply referred to as a "connection") between the output plug 103 of the digital TV 100 and the input plug 204 of the D-VHS 200.

A digital data processing device connected to the 1394 bus can be provided with a plurality of virtual output plugs and input plugs without depending on a structure of a terminal thereof. Each output plug and each input plug are controlled by output plug register (hereinafter referred to an "oPCR") and an input plug control register (hereinafter referred to as an "iPCR"), respectively.

The "oPCR" described above has, as shown in FIG. 16A, a "broadcast connection counter" region A12 (hereinafter referred to as a "region A12") indicating whether or not a broadcast connection is established to the output plug 103 controlled by the "oPCR," and a "point-to-point connection counter" region 13 (hereinafter referred to as a "region A13") indicating the number of point-to-point connections established to the output plug.

Furthermore, the "iPCR" has, as shown in FIG. 16B, a "broadcast connection counter" region A22 (hereinafter referred to as a "region A22") and a "point-to-point connection counter" region A23 (hereinafter referred to as a "region A23").

The image recording application 102 refers to the region A12 and region A13 of the "oPCR" to recognize output plugs 103 to each of which no connection has been currently established (neither a broadcast connection nor a point-to-point connection has been established). The image recording application 102 here selects a prescribed one of the recognized output plugs 103 to use it for establishment of a connection. Moreover, the image recording application 102 allocates an index number of the "oPCR" to control the output plug 103 selected here (FIG. 17, S1501).

Likewise, the image recording application 102 selects one input plug 204 used for establishment of the connection with reference to the regions A22 and regions A23 of "iPCRs" to allocate an index number of the "iPCR" controlling the selected input plug 204 (FIG. 17, S1502).

When having allocated the index numbers of the "oPCR" and the "iPCR," the image recording application 102 proceeds to a processing to allocate a channel number for use in establishment of the connection.

The use/non-use of channels on the 1394 bus is stored in a CHANNELS$_{13}$ AVAILABLE register (hereinafter referred to as a "CA register"), which is shown in FIG. 18. The CA register is formatted so that an unused channel number is written with "1" thereto and a used channel number is written with "0" thereto in order to indicate a correspondence by IRM (Isochronous Resource Manager) described later.

Then, the image recording application 102 reads the CA register in order to allocate a currently unused channel number to store a prescribed one channel number written with "1" thereto for correspondence. The image recording application 102, after storing the channel number, allocates a data transfer speed of the digital TV 100 stored therein and a data transfer speed of the D-VHS 200 stored therein. The image recording application 102 recognizes one of the data transfer speeds smaller than the other as a data transfer speed.

The image recording application 102 transfers the index numbers of the "oPCR" and the "iPCR," the channel number, the data transfer speed and the node IDs of the digital TV 100 and D-VHS 200 to a connection control unit 105.

The connection control means 105, when having allocated the index numbers, the channel number and others, allocates a channel number and a band width, which constitutes resources of the connection, from the IRM in the following manner.

The connection control means 105 at first transmits an allocate request for the channel number transferred from the image record application 102, to the IRM. Note that the IRM is installed to prescribed one digital data processing device connected to the 1394 bus.

The IRM, when receiving the channel allocate request, updates a value of the CA register corresponding to the channel number, which is an object of the allocate request, to "0." The IRM, when having updated the CA register, transmits an allocation notice of the channel number, which is an object of the allocate request, to the connection control means 105 (FIG. 17, S1503).

The connection control means 105, when receiving the allocation notice, calculates a bandwidth necessary for transferring program data according to a calculating formula defined in IEC 61883-1.

The connection control means 105, when having calculated the bandwidth, transfers an allocate request for the calculated bandwidth to the IRM.

The IRM writes a bandwidth unused for establishment of a connection in bw_remaining of the BANDWIDTH_AVAILABLE register (hereinafter referred to as a "BA register"). The IRM, when receiving the bandwidth allocate request, updates a current value of the BA register to a value less than the current value of the BA register by the bandwidth for which the allocate request has been issued. The IRM, when having updated the BA register, transmits an allocation notice indicating allocation of the bandwidth, which is an object of the allocate request, to the connection control means 105 (FIG. 17, S1504).

When, as described above, having allocated the channel number and the bandwidth (hereinafter appropriately referred to "resources"), the connection control means 105, as described below, updates the "oPCR" and the "iPCR" of the index numbers transferred from the image recording application 102 to establish a connection between an output plug 103 and an input plug 204.

The connection control means 105, when having allocated the resource, updates a value of the region A13 of the "oPCR" to "1," a value of the "channel number" region A14 (hereinafter referred to as a "region A14") to the channel number allocated from the IRM and furthermore, a value of a "overhead ID" region A16 to an overhead value of the bandwidth allocated from the IRM (FIG. 17, S1505).

In addition, the connection control means 105 writes the data transfer speed into a "data rate" region A15 of the "oPCR".

The connection control means 105, when having completed updating of the "oPCR," then proceeds to update processing of an "iPCR" corresponding to the index number of the "iPCR" transferred from the image recording application 102.

The connection control means 105 designates an index number of an "iPCR," which is an object of updating, and transmits an update request updating a value of the region A23 to "1" and a value of a "channel number" region A24 (hereinafter referred to as a "region A24") to the channel number allocated from the IRM to the D-VHS 200 (FIG. 17, S1506).

The D-VHS 200 updates a value of the region A23 to "1" and a value of the region 24 to the channel number allocated from the IRM. The D-VHS 200, when having updated the "iPCR," transmits a response of updating completion to the connection control means 105 of the digital TV 100 (FIG. 17, S1507).

When the "oPCR" and the "iPCR" have been updated in such a manner, the output plug 103 and the input plug 204 are connected to each other and a connection between the output plug 103 and the input plug 204 is established with the bandwidth allocated from the IRM.

The connection control means 105, when receiving the response of updating completion, outputs the program data from the output plug 103 controlled by the "oPCR" to the input plug 204 controlled by the "iPCR" using the bandwidth allocated from the IRM (FIG. 17, S1508).

The D-VHS 200, when the program data has been inputted from the input plug 204, records the program data onto a digital video tape loaded in the D-VHS 200 (FIG. 17, S1509).

The connection control means 105, when a connection has been established, generates a recording table 1601, shown in FIG. 18, in which written are the index numbers of the "oPCR" and the "iPCR" transferred from the image recording application 102, the ID of a digital data processing device equipped with an "oPCR" (hereinafter referred to as an "output node ID") and the ID of a device equipped with an "iPCR" (hereinafter referred to as an "input node ID"), and the recording table 1601 is stored into a storage unit 106 attaching a table number to the table.

When the recording is stopped, a user at first depresses a recording stop button of the remote controller 101 for the digital TV 100. Then, the name of the digital data processing device currently in recording is displayed on, for example, a screen of the remote controller 101 together with a broadcast channel in recording. The user selects the D-VHS 200 using a cursor key of the remote controller.

The image recording application 102, when the D-VHS 200 has been selected, allocates the node ID of the D-VHS 200 from the node ID table. Subsequent to this, the image recording application 102 further allocates a table number of the recording table 1601 in which the allocated node ID has been written as an input node ID to transfer the table number to the connection control unit 105.

The connection control unit 105, when having allocated the table number, further allocates the recording table 1601 attached with the table number from the storage unit 106. The connection control unit 105, when having allocated the recording table 1601, performs disconnection of a connection corresponding to the recording table 1601 in the following manner.

The connection control unit 105 reads the index number of the "iPCR" and the input node ID (here, the node ID of the D-VHS 200) from the allocated recording table 1601. The connection control unit 105, when having read the index number of the "iPCR," transmits an update request updating a value of the region A23 of the "iPCR" of the index number to "0" to the D-VHS 200 (FIG. 21, S1901).

When the D-VHS 200 has updated a value of the region A23 of the "iPCR" according to the update request, the "iPCR" stops inputting of the program data from the input plug 204 (FIG. 21. S1902→S1903). Then, when having updated a value of the region A23, the D-VHS 200 transmits a response of updating completion to the connection control unit 105.

When receiving a response of updating completion, the connection control unit 105 reads the index number of the "oPCR" of the allocated recording table 1601. The connection control unit 105 updates a value of the region A13 of the "oPCR" of the read index number to "0" (FIG. 21, S1904).

The updating of the regions A23 and A13 to "0" as described above means disconnection between the out plug 103 and the input plug 204. When the region A13 has been updated to "0," the "oPCR" stops an output of a program data from the output plug 103 (FIG. 21, S1905).

When completing updating of the "oPCR," the connection control unit 105 performs then a release of a bandwidth having been used for establishment of a connection.

The connection control unit 105 reads a value of a "pay load" region A 17 of the "oPCR" into which the maximum packet size of an isochronous stream that can be outputted by the output plug 103 and a value of the "data rate" region A15 to calculate a bandwidth allocated from the IRM as described above. Then, the connection control unit 105 transmits the calculated bandwidth and a release request for the bandwidth to the IRM.

The IRM, when receiving the bandwidth and the release request, adds a value of the received bandwidth to a value of the BA register (FIG. 21, S1906). With such a procedure, the bandwidth having been used for establishment of a connection is released. When updating a value of the BA register, the IRM transmits a response of release completion of the bandwidth to the connection control unit 105.

The connection control unit 105, when receiving a response of release completion of the bandwidth, reads a channel number having been written into the "channel number" region A14 of the "oPCR" to transmit the read channel number and a release request for the channel number to the IRM.

The IRM, when receiving the release request for a channel number, updates a region of the CA register corresponding to the received channel number to "1" (FIG. 21, S1907). With this updating performed, the channel number having been used for establishment of a connection is managed as non-use in the IRM to thereby release the channel number. The IRM, when having updated the CA register, transmits a response of release completion of the channel number to the connection control unit 105.

When the BA register and the CA register have been updated as described above, the bandwidth and the channel number having been used for a connection are released and the bandwidth or the channel number are hereafter managed in the IRM as an unused bandwidth or an unused channel.

It is imagined that the 1394 bus is used as a bus connecting a television set, a D-VHS and others in a home. For example, a case is considered where a D-VHS and television sets installed in rooms are connected by the 1394 bus and the television sets are individually placed in a state capable of viewing program data and others having been recorded in the D-VHS. When many of television sets and a D-VHS are connected to the 1394 bus, there occurs a chance to cause temporary concentration of establishment of a connection or disconnection between the D-VHS and each of the television sets.

If concentration of establishment of connections and disconnections occurs, a case arises where, for example, an "oPCR" and an IPCR" are in process for connection or disconnection of an input plug and output plug for use in another connection when the connection control unit 105, after completing a transfer of a program data, disconnects a connection. In such a case, since the "oPCR" and the "iPCR" are performing connection or disconnection of an input plug or output plug for used in another connection, the "oPCR" and the "iPCR" cannot deal with update requests for the regions A13 and A23 transmitted from the connection control unit 105.

Accordingly, the "oPCR" and the "iPCR" manage an input plug and output plug through which no program data actually flow as being used for establishment of a connection. Therefore, a new connection using the input plug and output plug can not be spanned on the 1394 bus.

A case arises where when the connection control unit 105 intends to disconnect a connection through which no program data flows, the IRM updates the CA register and the BA register for establishing of another connection or disconnection of a connection. In such a case, the IRM cannot perform a release request for a bandwidth and a channel transmitted from the connection control unit 105 since the IRM performs updating of the CA register and the BA register. Therefore, since neither of the CA register and the BA register is updated according to the release request, the CA register and the BA register manage a channel number and a bandwidth actually not used for establishment of a connection as being used therefor. For this reason, despite of availability of resources (a channel and a bandwidth) not actually used, program data cannot be transferred into the 1394 bus.

As for such a case, it is not sufficiently stipulated in IEC 61833-1 how an "iPCR", an "oPCR," a BA register and a CA register are updated.

In a conventional digital data processing device, when there was neither of an input plug and an output plug for establishment of a connection, or when the system was short of resources, a user inserted a plug for a digital data processing device into or pulled out it from the 1394 bus, or turned off a power supply of the digital data processing device to generate a bus reset and to thereby, disconnect an input plug and output plug or release resources. With theses methods, however, since a necessity arises for a user to detect a state where a connection has become disabled to establish, no new connection to a digital data processing device could be established as far as the user cannot detect an anomaly.

SUMMARY OF THE INVENTION

It is accordingly an object of the present invention is to provide a digital data processing device performing restoration of a connection having been established prior to bus reset by automatically bus resetting in a prescribed condition.

A digital data processing device of the present invention includes a storage unit operable to store connection information on a connection having been established between the digital data processing device and another device. Furthermore, the digital data processing device includes a disconnection trial unit performing release of a resource used in the connection as a trial.

A case arises where the disconnection trial unit can perform no release of a resource according to a communication condition of a device to which a connection has been established. Therefore, the disconnection trial unit repeatedly performs a trial for release of a resource when the disconnection trial unit can perform no release of the resource. However, a case also arises where no release of a resource is possible even if release of the resource is repeated as a trial.

In such a case, the disconnection trial unit writes the number of release trials in failure to release of the resource and a resource amount to which release has been failed into the storage unit. A bus reset unit is installed to the digital data processing device, which generates a bus reset in a case where the number of release trials or the resource amount having been written into the storage unit reaches a prescribed threshold value.

By causing a bus reset with the bus reset unit in this way, automatic release can be realized of the resource which cannot be released even after many trials by the disconnection trial unit.

When a digital data processing device of which a connection to be disconnected has been established performs an asynchronous transaction, the disconnection trial unit has a case not to be able to release a resource.

Therefore, the digital data processing device to which a connection has been established is installed with an asynchronous transaction detecting unit operable to detect an asynchronous transaction of the digital data processing device. The disconnection trial unit performs release of a resource while the digital data processing device performs no asynchronous transaction.

While an asynchronous transaction is not performed, there is available a higher possibility for the disconnection trial unit to release a resource, thereby enabling decrease in the number of performed bus resets.

BRIEF DESCRIPTION OF THE DRAWINGS

FIG. 18 is a conceptual diagram of a CHANNELS_AVAILABLE register;

Figure 19:
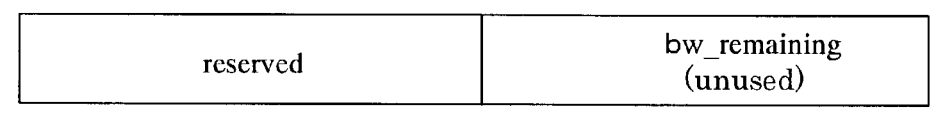

FIG. 19 is a conceptual diagram of a BANDWIDTH_AVAILABLE register;

DESCRIPTION OF THE PREFERRED EMBODIMENTS (First Embodiment)

Figure 14:
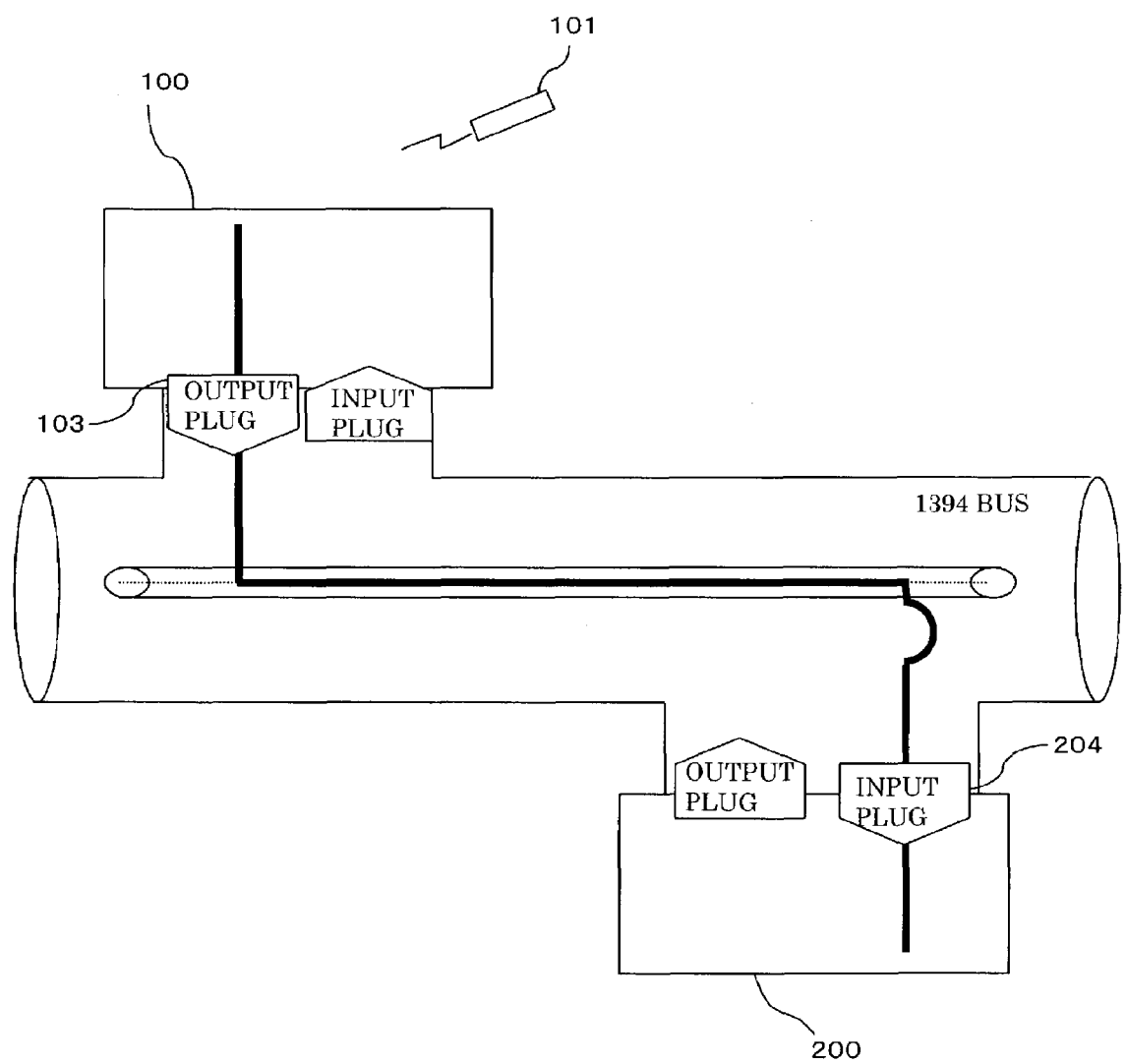
FIG. 14 is a descriptive illustration of an isochronous stream input/output technique.
Figure 15:
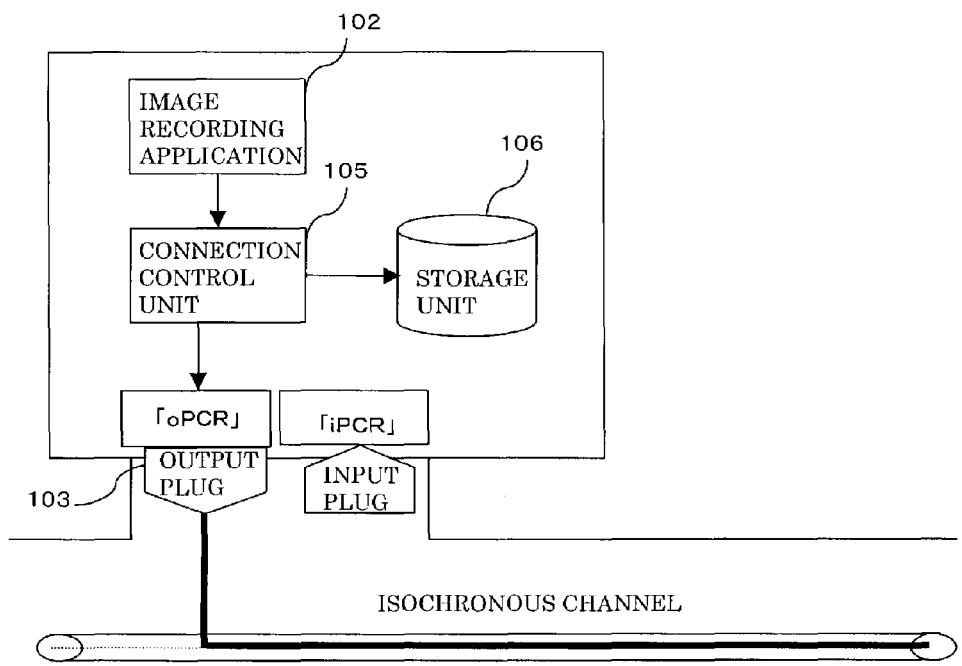
FIG. 15 is a block diagram of a main part of a conventional digital data processing device.

A digital data processing device 100 (a digital TV 100) to which the present invention is applied is connected to a serial bus in conformity with the IEEE 1394 serial bus interface standard (hereinafter referred to as a "1394 bus"). Connected to the 1394 bus, as described in "prior art of the invention", are a plurality of digital data processing devices such as a D-VHS 200 shown in FIG. 14 and a digital video cameral, a MD player and others, not shown in the figure.

Figure 1:
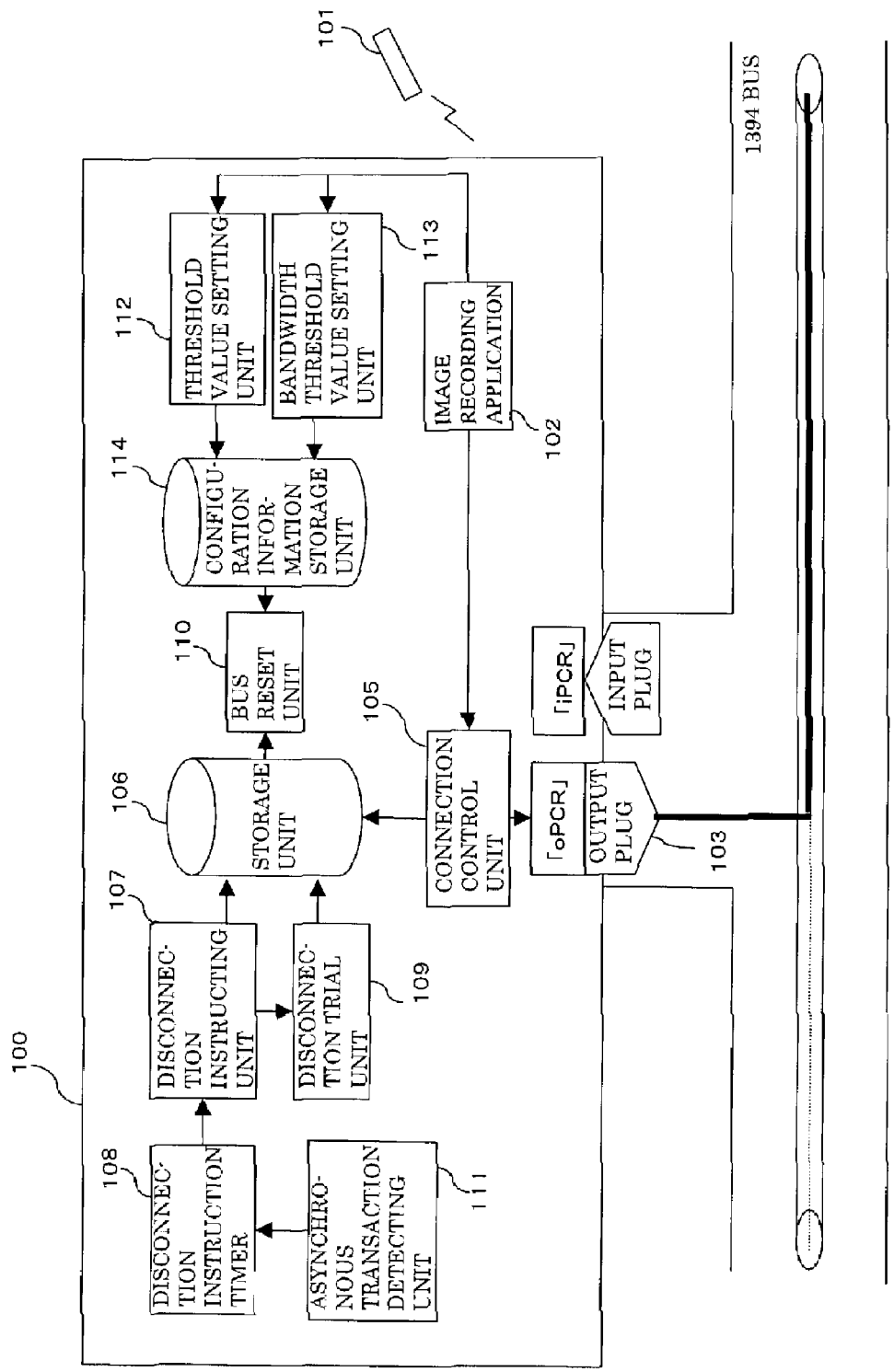
FIG. 1 is a block diagram of a main part of a digital TV set to which the present invention is applied.
Figure 2:
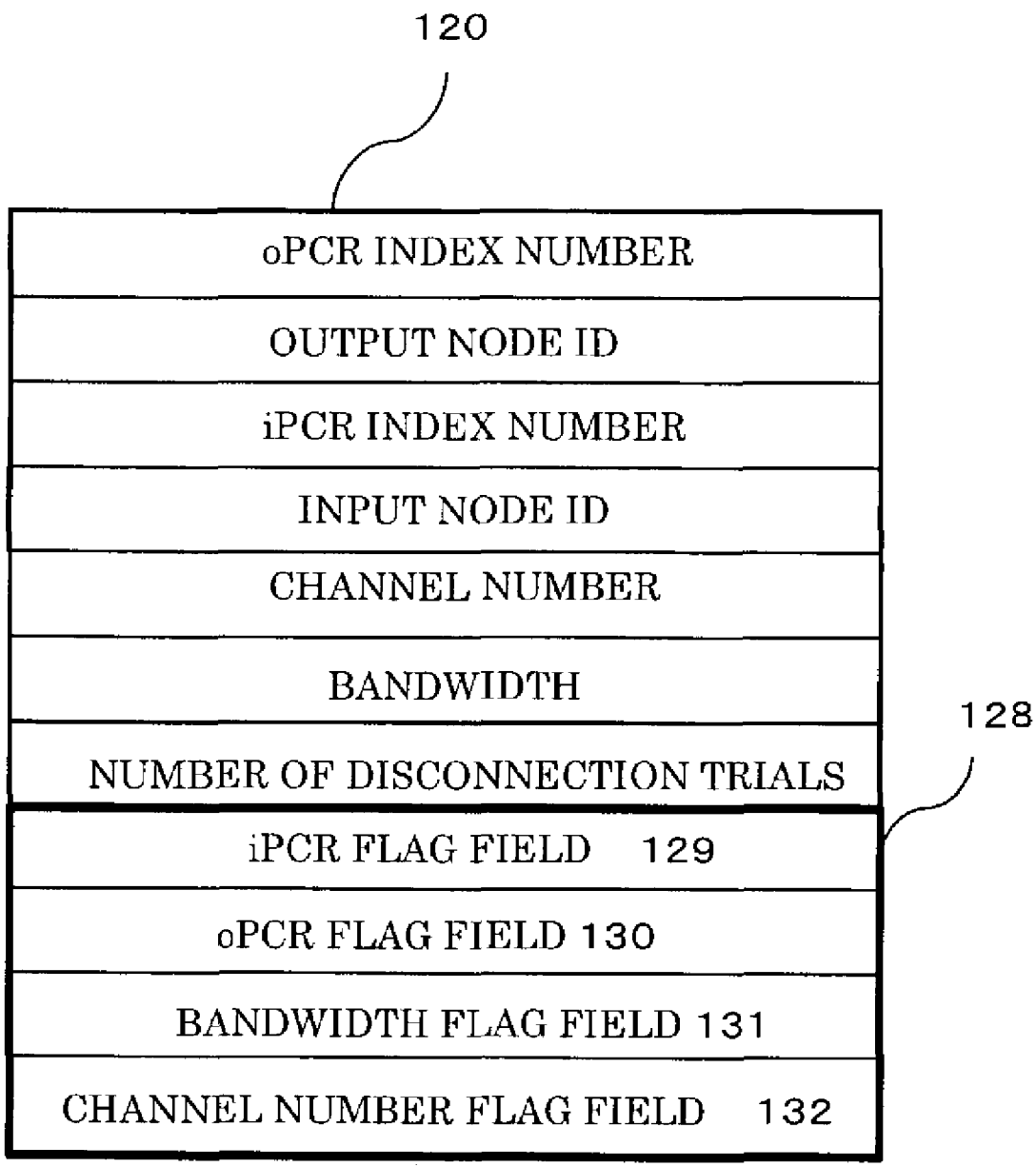
FIG. 2 is a conceptual diagram of a connection state table.
Figure 17:
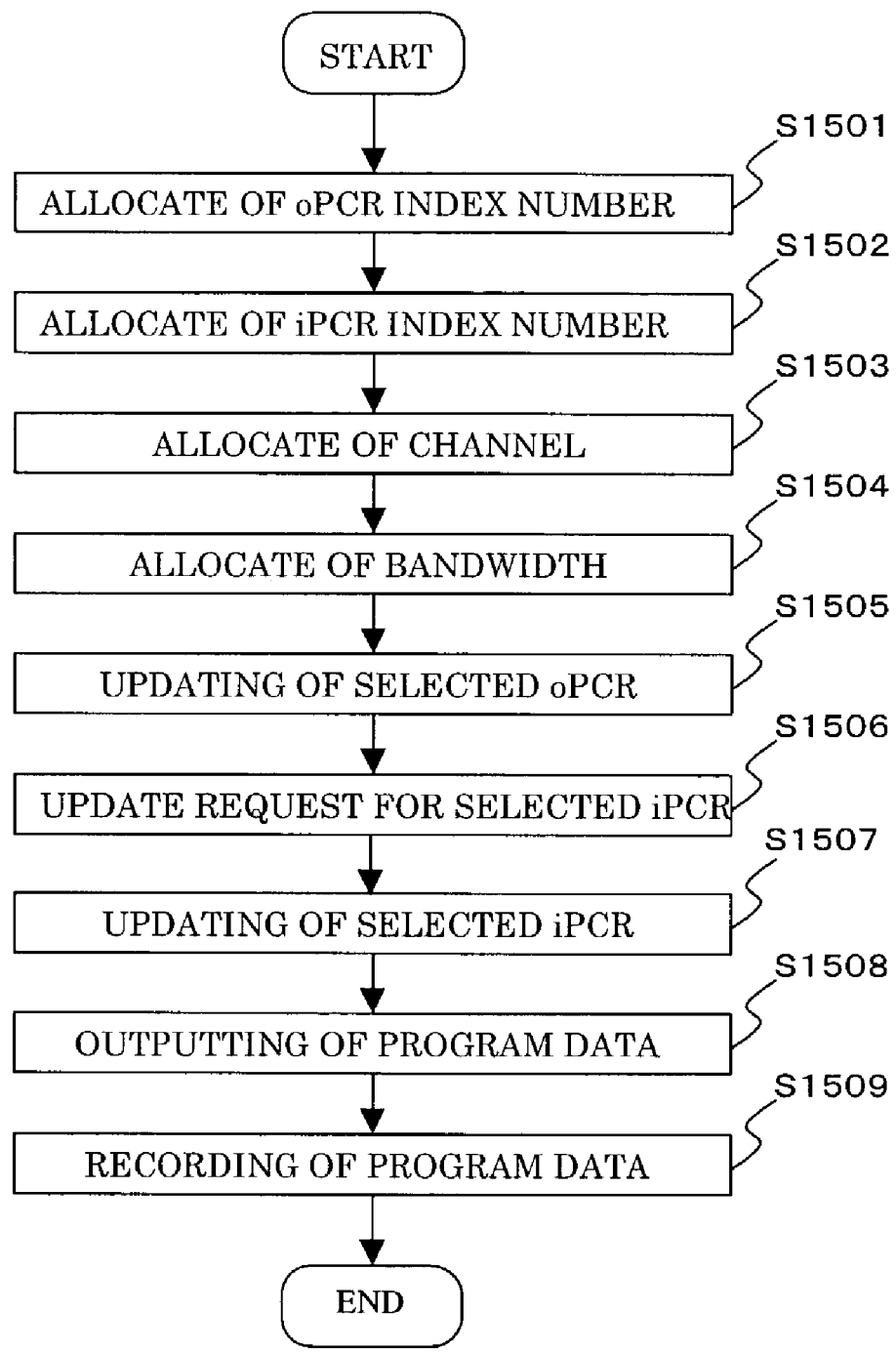
FIG. 17 is a flowchart showing a procedure for establishment of a connection.

A connection control unit 105 shown in FIG. 1 establishes a connection between the digital TV 100 and the D-VHS 200 in a procedure similar to the above conventional technique (FIG. 17, S1501→S1507) when an image recording command to record a program data with the D-VHS 200 is inputted from a remote controller 101 as described in "prior art of the invention". The connection control unit 105, when having established the connection, generates a connection state table 120 shown in FIG. 2.

The connection state table 120 is constituted of: a field into which written is connection information including an index number of an "oPCR," an index number of "iPCR," an output node ID, an input node ID, a channel number, a bandwidth, all used for establishment of a connection, and the number of disconnection trials of input and output plugs performed by disconnection trial unit 109 described later; and a connection state flag field 128. Note that the number of disconnection trials when the connection state table 120 is generated is 0.

Figure 20:
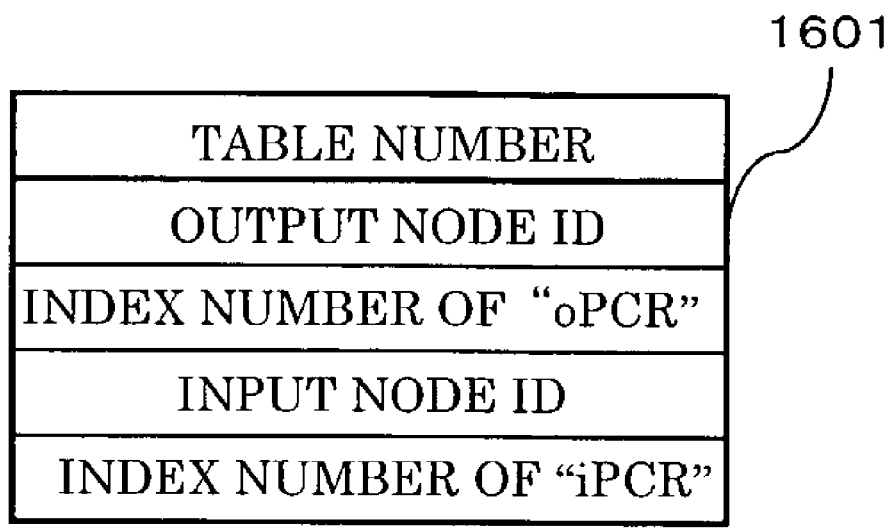
FIG. 20 is a conceptual diagram of a recording table.
Figure 21:
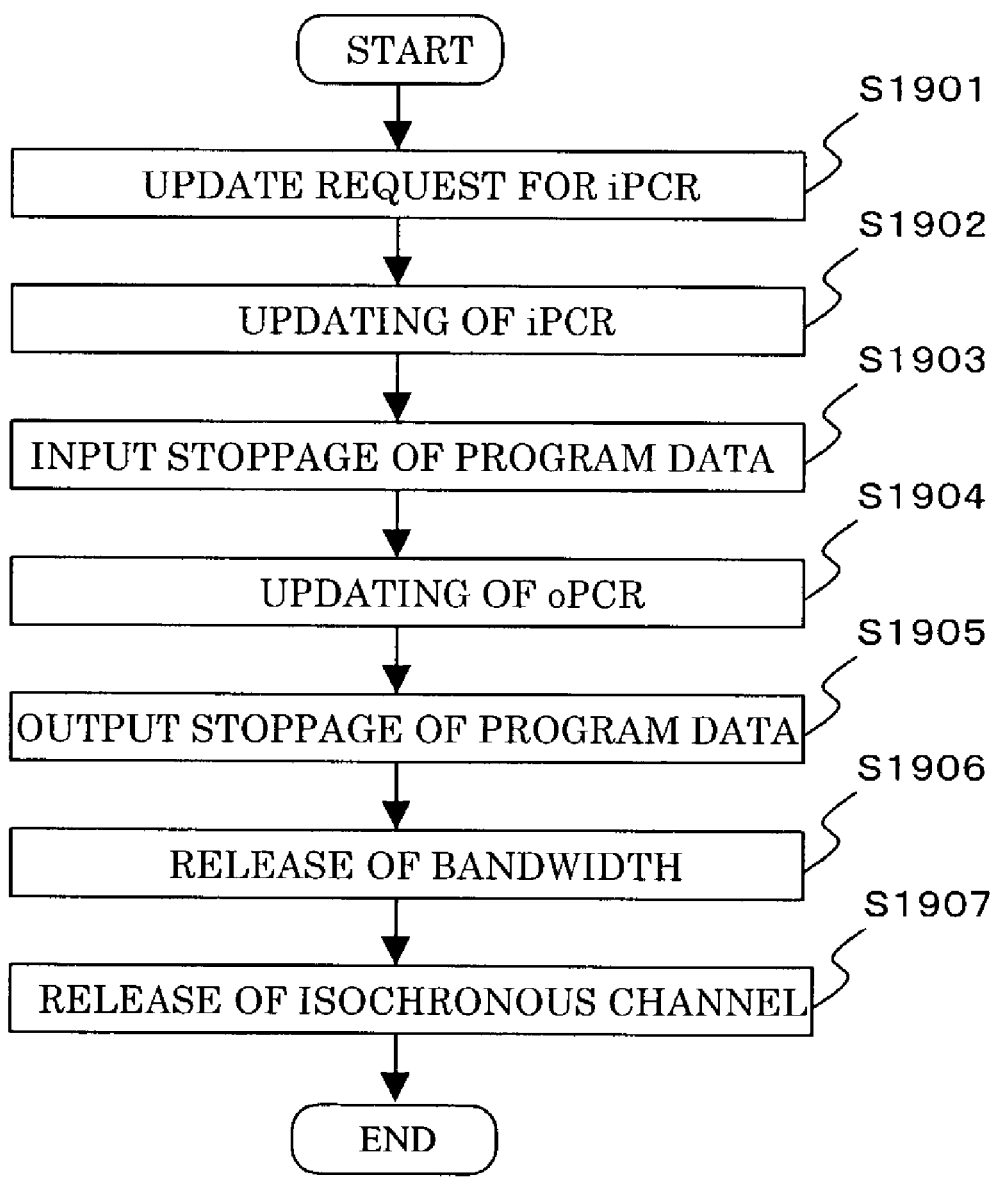
FIG. 21 is a flowchart showing a procedure for disconnection of a conventional connection.

Note that the connection control unit 105 of the present invention does not have to generate the recording table 1601 shown in FIG. 20.

The connection control unit 105, when having generated a connection state table 120, registers the connection state table 120 at the storage unit 106.

The connection control unit 105, as described above, when having registered the connection state table 120 at the storage unit 106, outputs a program data to the input plug 204 controlled with the "iPCR" from the output plug 103 controlled by the "oPCR".

The D-VHS 200 records a program data inputted from the input plug 204 onto a digital video tape loaded in the D-VHS 200.

Note that a timing at which the connection state table 120 is generated is not limited to when a connection is established, but may also be at the same time that, for example, the connection control unit 105 allocates an input/output node ID, index numbers of the "oPCR" and the "iPCR," a channel number and a bandwidth.

When a user stops recording of the D-VHS 200, the user at first depresses a recording stop button of the remote controller 101. Then, a list name of digital data processing devices currently in recording among digital data processing devices connected the 1394 bus is displayed on a screen of the remote controller 101 and the user selects the D-VHS 200 with a cursor key.

A fact that the D-VHS 200 has been selected is allocated by the image recording application 102. The image recording application 102, when having allocated the fact of selection of the D-VHS 200, refers a node ID table in which the names and ID nodes of digital data processing devices are related to each other to allocate node IDs of the D-VHS 200.

Then, the image recording application 102 extracts a connection state table 120 into which node IDs of the D-VHS 200 have been written as an input node ID from the storage unit 106. The image recording application 102 transfers the extracted connection state table 120 to the connection control unit 105.

The connection control unit 105, when having allocated the connection state table 120, proceeds to a disconnection processing for a connection.

The connection control unit 105, when having proceeded to the disconnection processing, sets an iPCR flag field 129, an oPCR flag field 130, a bandwidth flag field 131 and a channel number flag field 132 in the connection state flag field 128 of the connection state table 120. The connection control unit 105 sets flags "1" or "0" (in this embodiment, a flag of "1" is set) in the flag fields 129 to 132 set in the connection state flag field 128 (FIG. 3, S301).

The connection control unit 105, when having set flags in the flag fields 129 to 132, reads an input node ID (here, an ID of the D-VHS 200) and an index number of the "iPCR" having written into the allocated connection state table 120. The connection control unit 105 transmits an update request for updating a value of the region A23 of the "iPCR" of the read index number to "0" to the D-VHS 200 (FIG. 3, S302).

Figure 16A:
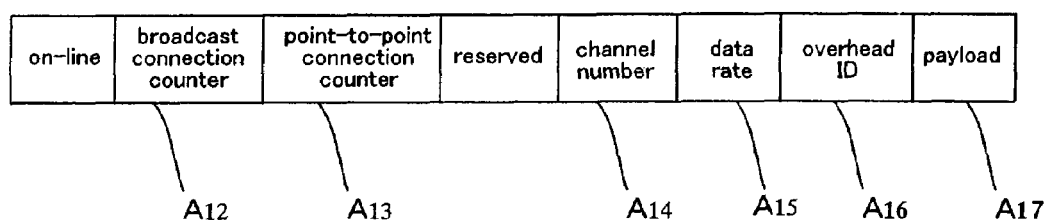
FIGS. 16A and 16B are formats of an oPCR and an iPCR.
Figure 16B:
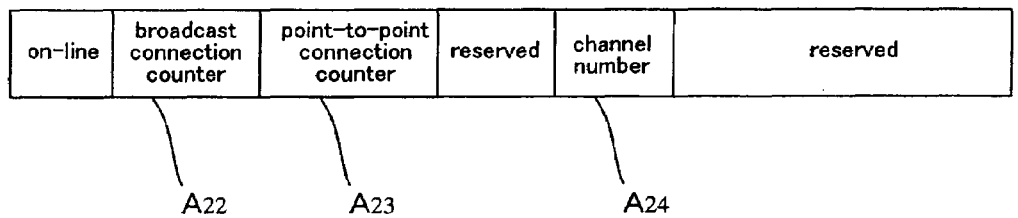

The D-VHS 200, as described in "prior art of the invention", when having updated a value of the region A23 of the "iPCR" shown in FIG. 16B, transmits to a response of updating completion of the "iPCR" to the connection control unit 105.

Figure 3:
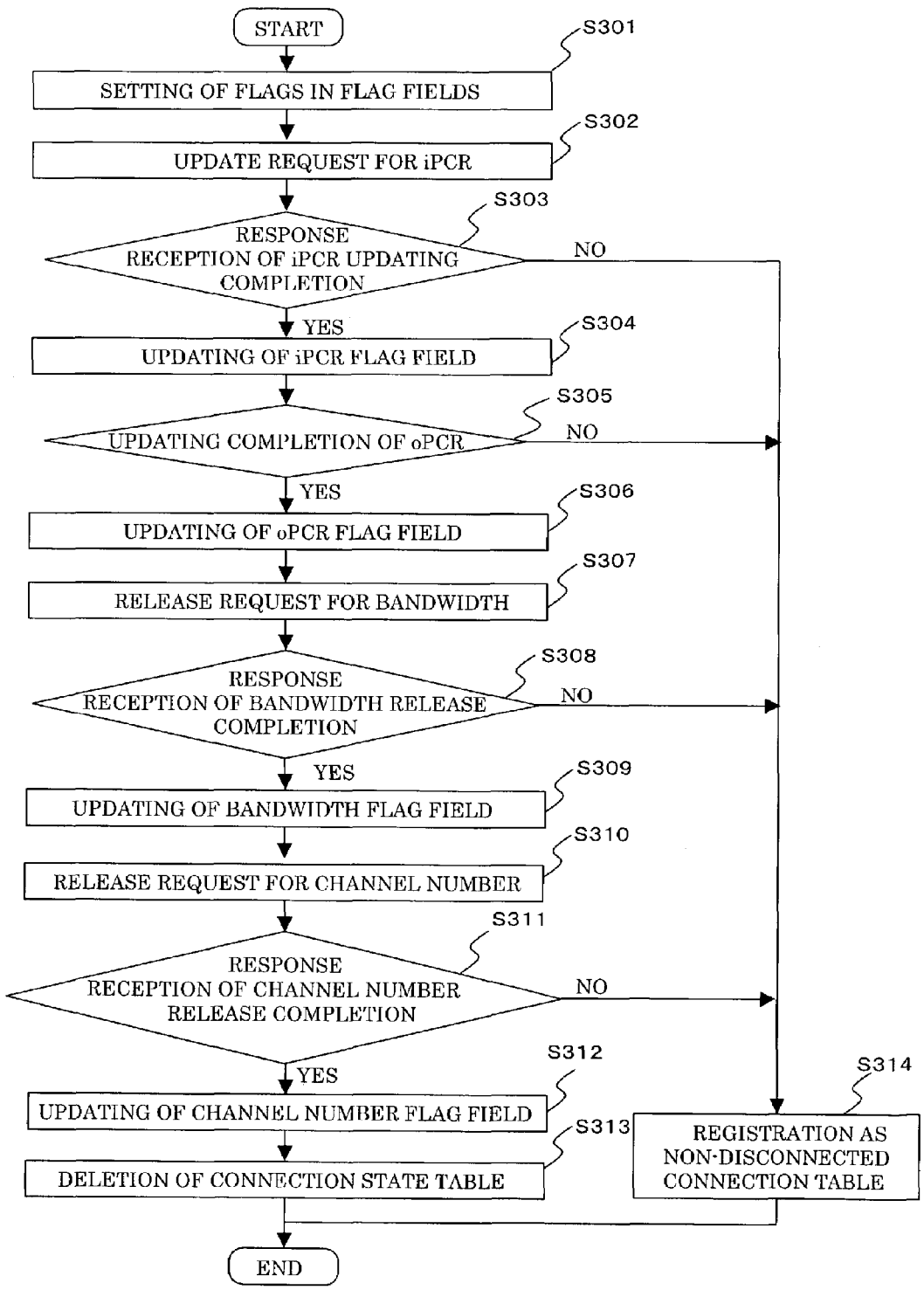
FIG. 3 is a flowchart showing a disconnecting procedure for a connection in an embodiment of the present invention.

The connection control unit 105, when receiving an response of updating completion from the D-VHS 200, updates a value of the iPCR flag field 129 of the connection state table 120 to "0" (FIG. 3, S303→S304).

The connection control unit 105, when having updated a value of the iPCR flag field 129 to "0", reads an output node ID and an index number of the "oPCR" having written into the connection state table 120. Since the "oPCR" is installed in the digital TV 100, the "oPCR" updates the region A13 of the "oPCR" of the index number read by the connection control unit 105 itself to "0".

The connection control unit 105, when having updated the "oPCR", updates a value of the oPCR flag field 130 to "0" (FIG. 3, S305→S306).

Then the connection control unit 105 reads a bandwidth having written into the connection state table 120 to transmit a release request for the bandwidth to the IRM (FIG. 3, S307).

The IRM, when receiving the release request for a bandwidth, updates the BA register to perform a release of the bandwidth as described in "prior art of the invention". The IRM, when having updated the BA register, transmits a response of release completion of the bandwidth to the connection control unit 105.

The connection control unit 105, when receiving the response of the release completion of the bandwidth, updates a value of the bandwidth field 131 to "0" (FIG. 3, S308 to S309).

Then, the connection control unit 105 reads a channel number having written into the connection state table 120 to transmit a release request for the channel number to the IRM (FIG. 3, S310).

The IRM, when receiving the release request for the channel number, updates a region of the CA register corresponding to a channel number to "1" to perform a release of the channel number as described in the conventional technique. The IRM, when having released the channel number, transmits a response of release completion to the connection control unit 105.

The connection control unit 105, when receiving the response of release completion of the channel number, updates a value of the channel number flag field 132 to "0" (FIG. 3, S311→S312).

The connection control unit 105, as described above, updates the flags of the flag fields 129 to 132 set in the connection state flag field 128 to "0" and then, deletes the connection state table 120 from the storage unit 106 (FIG. 3, S313).

A case arises where an "oPCR" and an "iPCR" perform connection or disconnection of the input plug or the output plug used for another connection and a case arises where the IRM performs updating of a CA register and a BA register for establishment of another connection or another disconnection in process.

Therefore, when the connection control unit 105 transmits an update request for an "iPCR" to the D-VHS 200, the D-VHS 200 cannot perform updating of the "iPCR as described above if the "iPCR is performing connection or disconnection of an input plug used for another connection. Therefore, the connection control unit 105 cannot receive the response of updating completion.

Likewise, if an "oPCR" is performing connection or disconnection of an output plug used for another connection, the connection control unit 105 cannot update the "oPCR" as described above. If the IRM is performing updating of a CA register and a BA register for establishment of another connection or another disconnection, the IRM cannot perform a release of a bandwidth or a release of a channel number, as described above.

Therefore, the connection control unit 105 registers the connection state table 120 at the storage unit 106 as a non-disconnected connection table (FIG. 3, S314) in a case where the connection control unit 105 cannot receive a response of updating completion or release completion within a prescribed time after transmitting the update request or the release request (FIG. 3, S303, S308 and S311) or in a case where updating of an "oPCR" is impossible (FIG. 3, S305). The connection control unit 105, when having registered the non-disabled connection table at the storage unit 106, terminates a disconnection processing for a connection.

The non-disconnected connection table having been registered at the storage unit 106 is monitored by a connection instructing unit 107 installed to the digital TV 100. The connection instructing unit 107 activates a disconnection instruction timer 108 when having confirmed that the non-connected connection table is registered at the storage unit 106.

When a timeout occurs in the disconnection instructing timer 108, the disconnection instructing unit 107 transmits a disconnection request for a connection corresponding to the non-disconnected connection table, to a disconnection trial unit 109.

Figure 4:
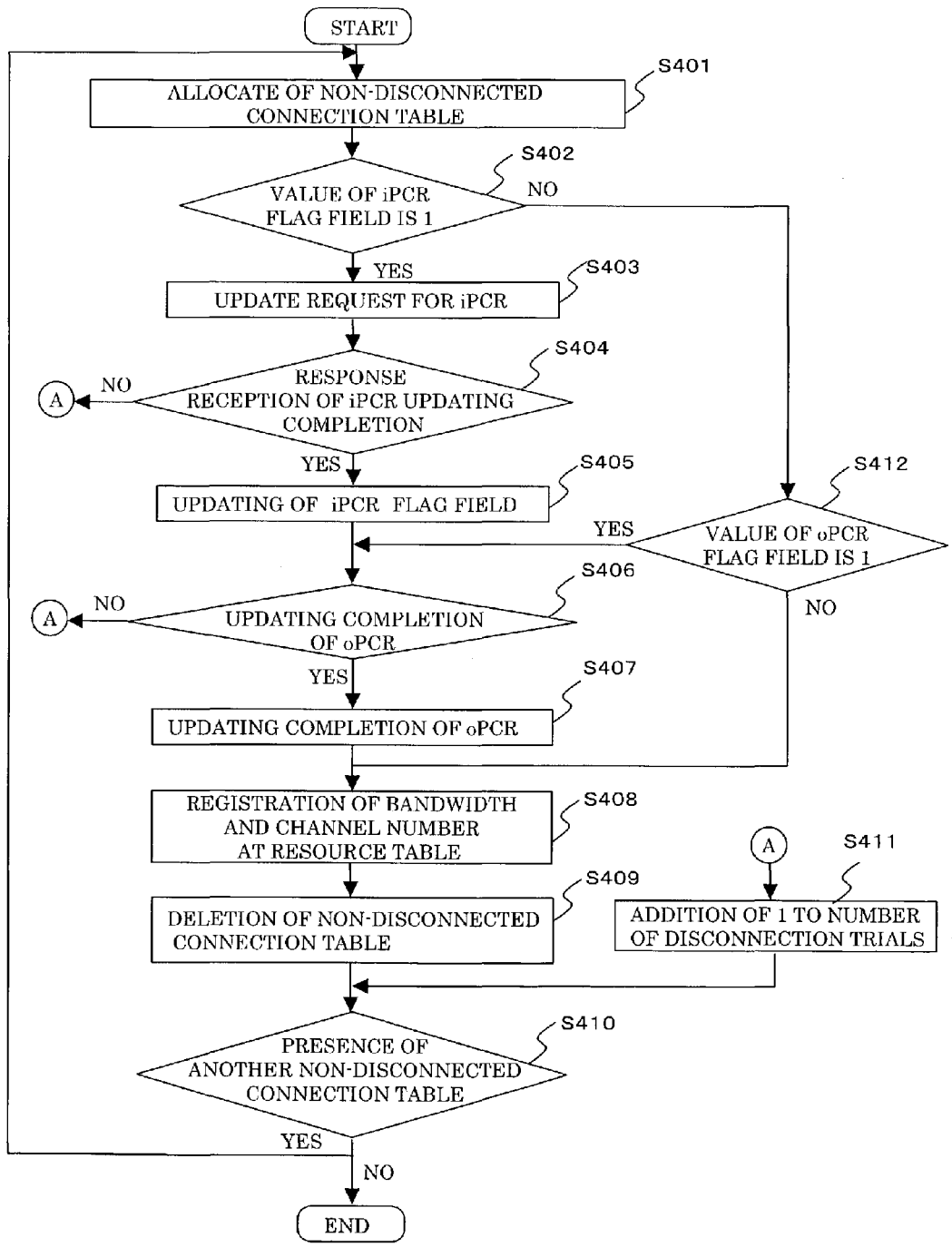
FIG. 4 is a flowchart showing a disconnection processing for an input plug and output plug in an embodiment of the present invention.

The disconnection trial unit 109, when receiving a disconnection request, allocates a non-disconnected connection table, which becomes an object of a disconnection request, from the storage unit 106 in order to perform a disconnection processing for the input plug and output plug (FIG. 4, S401). Then, the disconnection trial unit 109 reads a value of an iPCR flag field of the non-disconnected connection table (FIG. 4, S402).

The disconnection trial unit 109, when a read value read by itself is "1," reads the index number of an "iPCR" having been written into the non-disconnected connection table to transmit an update request for the region A23 of the "iPCR" of the index number to the digital data processing device (D-VHS 200) of an input node ID having been written into the non-disconnected connection table (FIG. 4, S403).

The D-VHS 200 receives the update request, a value of the region A23 of the "iPCR" is updated as described above and then, transmits a response of updating completion to the disconnection trial unit 109.

The disconnection trial unit 109, when receiving a response of the updating completion, updates a value of the iPCR flag field 129 to "0" (FIG. 4, S404→S405).

The disconnection trial unit 109, when having updated the value of the iPCR flag field, performs updating of the region A13 of the "oPCR" of an index number having been written into the non-disconnected connection table (FIG. 4, S406). The disconnection trial unit 109, when having updated the region A13, updates a value of the oPCR flag field 130 to "0" (FIG. 4, S407).

Figure 5:
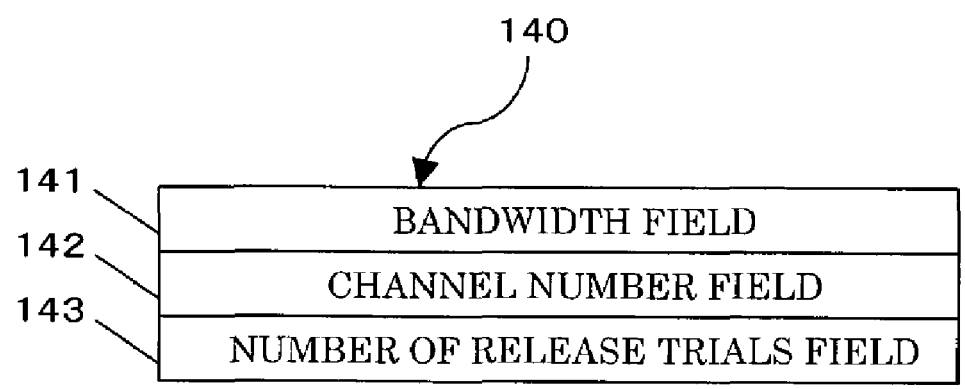
FIG. 5 is a conceptual diagram of a resource table.

The disconnection trial unit 109, when having updated the oPCR flag field 130, extracts a bandwidth and a channel number having been written into the non-disconnected table. The disconnection trial unit 109, when having extracted the bandwidth and the channel number, adds the extracted bandwidth to a value of a bandwidth field 141 of a source table 140 shown in FIG. 5 stored in the storage unit 106 and registers the extracted channel number at a channel number field 142 (FIG. 4, S408).

The disconnection trial unit 109, when having registered the channel number at the resource table 140, deletes the non-disconnected connection table from the storage unit 106 to complete a disconnection processing of the input plug and output plug (FIG. 4, S409).

The disconnection trial unit 109, when having completed the disconnection processing of the input plug and output plug, confirms whether or not another non-disconnected connection table has been registered at the storage unit 106. The disconnection trial unit 109, when another connection state table 120 has been registered, also performs a disconnection processing for an input plug and output plug on another connection state table 120 (FIG. 4, S410).

When the disconnection of an input and output plug is performed, the D-VHS 200 cannot receive an update request for an "iPCR" to update the region A23 of the "iPCR" if the "iPCR" is performing connection or disconnection of the input plug used for the second connection. Therefore, the disconnection trial unit 109 cannot receive a notice of updating completion of the "iPCR".

Therefore, in a case where the disconnection trial unit 109 cannot receive a notice of updating completion of an "iPCR" within a prescribed time after transmitting an update request for the "iPCR", that is when cannot disconnect the input plug, adds 1 to the number of disconnection trials of the non-disconnected connection table (FIG. 4, S404→S411).

Likewise, while an "oPCR" is performing a connection or disconnection of the output plug used for a second connection during a disconnection processing of an input plug and output plug, the disconnection trial unit 109 cannot update the region A13 of the "oPCR". In this case as well, the disconnection trial unit 109 adds 1 to the number of disconnection trials (FIG. 4, S406→S411).

The disconnection trial unit 109, when having added 1 to the number of disconnection trials, completes a disconnection of the input plug and output plug of the connection (FIG. 4, S411→S410).

Among connections corresponding to the non-disconnected connection table, there are connections in which only an input plug 204 is disconnected or an input plug 204 and output plug 103 are disconnected, and a connection in which an input plug 204 and output plug 103 are disconnected and furthermore, a bandwidth has been released. Therefore, there is available a non-disconnected connection table in which values of the iPCR flag field 129, the oPCR flag field 130 and the bandwidth flag field 131 are "0".

Therefore, the disconnection trial unit 109 at S402, when a value of the iPCR flag field is "0", then reads a value of the oPCR flag field 130 (FIG. 4, S412).

The disconnection trial unit 109, when a value of the oPCR flag field 130 is "1," performs updating of the "oPCR" of the S406 (FIG. 4, S412→S406). The disconnection trial unit 109, when a value of the oPCR is "0", extracts a bandwidth and a channel number having been written into the non-disconnected connection table to register the extracted bandwidth and channel number at the resource table 140 (FIG. 4, S412→S408).

When having performed disconnection processings for input plugs and output plugs on all of the non-disconnected connection tables having been registered at the storage unit 106, the disconnection trial unit 109 in succession performs release processing of resources having been registered at the resource table 140.

Figure 6:
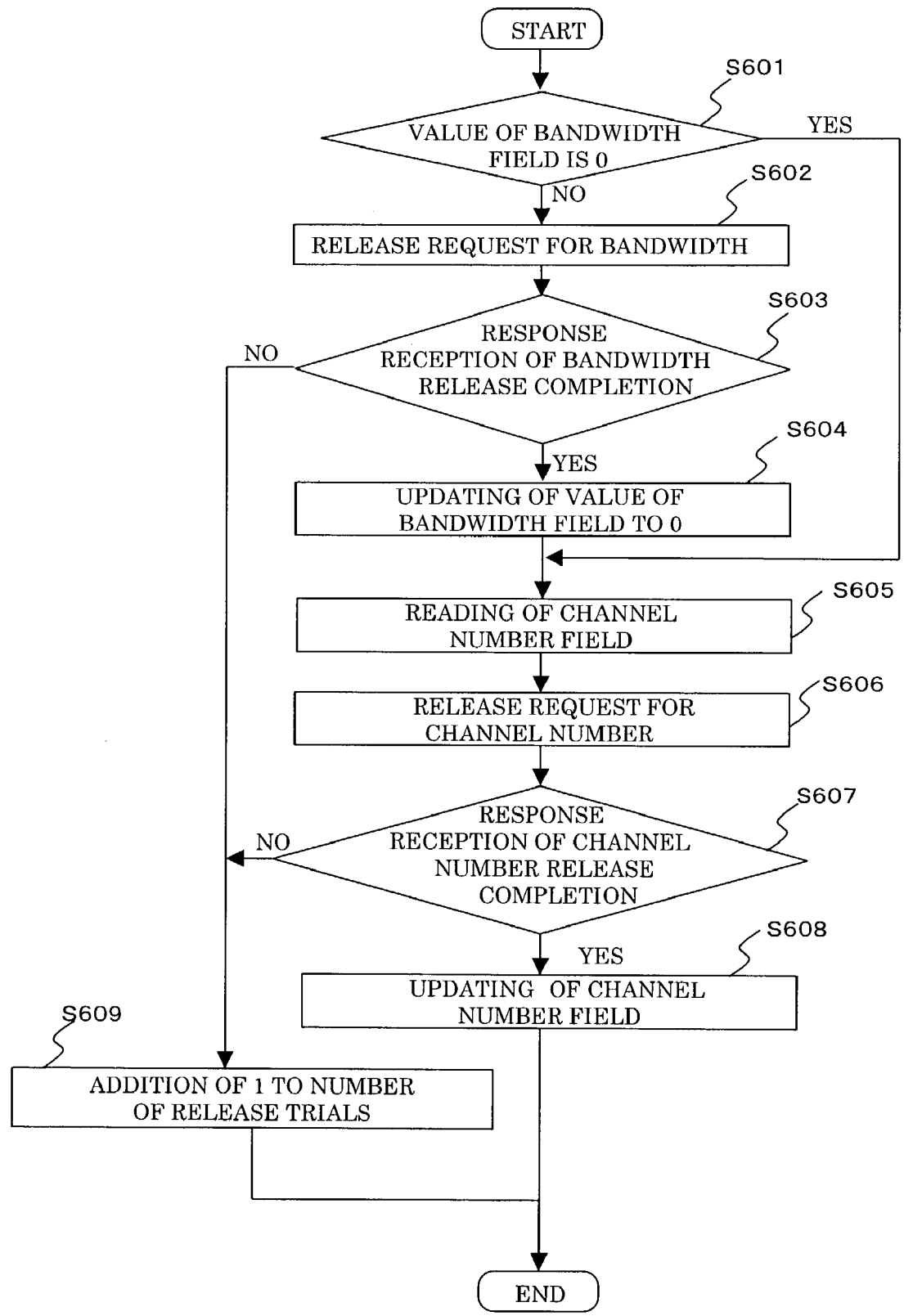
FIG. 6 is a flowchart showing a procedure for determination of bus reset generation in an embodiment of the present invention.

The disconnection trial unit 109 at first refers to the bandwidth field 141 of the resource table 140 to determine whether or not a value of the bandwidth field 141 is "0" (FIG. 6, S601).

The disconnection trial unit 109, when a value of the bandwidth field 141 here is "0", proceeds to determination on whether or not a channel number has been registered at the channel number field 142 (FIG. 6, S605).

The disconnection trial unit 109, when on the other hand, a value of the bandwidth field 141 is not "0", transmits a release request for a bandwidth of a value having been written into the bandwidth field 141 to the IRM (FIG. 6, S602).

The disconnection trial unit 109, when the IRM releases the bandwidth according to the bandwidth release request, transmits a response of release completion of the bandwidth to the disconnection trial unit 109.

The disconnection trial unit 109, when receiving the response of release completion of the bandwidth, updates a value of the bandwidth field 141 to "0" (FIG. 6, S603→S604).

The disconnection trial unit 109, when having updated the bandwidth field 141, reads all the channel numbers having been registered at the channel number field 142 of the resource table 140 (FIG. 6, S605). The disconnection trial unit 109 transmits a release request for all the read channel numbers to the IRM (FIG. 6, S606).

The IRM, when having released a channel number according to the release request for the channel number, transmits a response of release completion to the disconnection trial unit 109.

The disconnection trial unit 109, when receiving the response of release completion of the channel number, erases the channel number having been registered at the channel number field 142 (FIG. 6, S607→S608). The disconnection trial unit 109 completes a release processing for a resource when having erased the channel number having been registered at the channel number field 142.

Note that if the IRM performs updating of a CA register and a BA register for establishment of connection or disconnection between digital data processing devices during the release processing for a resource, the IRM cannot receive a release request for the bandwidth or a release request for the channel number. In the cases, the IRM cannot release a bandwidth or a release of a channel number according to a release request for the bandwidth or channel number. For this reason, the disconnection trial unit 109 cannot receive a notice of updating completion of a bandwidth or channel number.

If the disconnection trial unit 109 cannot receive a response of release completion within a prescribed time from transmission of a release request for a bandwidth or a channel number, that is when disabling a release of a resource in a normal fashion, the disconnection trial unit 109 adds 1 to the number of release trials field 143 of the resource table 140 (FIG. 6, S609). The disconnection trial unit 109, when having added 1 to the number of release trials field 143, completes a release processing for a resource.

A bus reset unit 110 monitors the number of disconnection trials having been written into the non-disconnected connection table, the bandwidth field 141 and the channel number field 142 of the resource table 140, a bandwidth, a channel number and the number of release trials having been written into the number of release trials field 143.

The bus reset unit 110, when the number of disconnection trials reaches a prescribed threshold value, performs bus reset to disconnect all the connections having been established on the 1394 bus.

Likewise, the bust reset unit 110 performs bus reset when a prescribed threshold value is reached by a total amount of bandwidths having been written into the bandwidth field 141 or a prescribed threshold value is reached by the number of channel numbers having been written into the channel number field 142 and in addition thereto, a prescribed threshold value is reached by the number of release trials 143.

The bus reset unit 110 to delete the non-disconnected connection table from the storage unit 106, to reset a value having been written into the resource table 140 and to furthermore, restore the "oPCR" and "iPCR," and the CA register and the BA register to respective initial states.

As described above, by installing the bus reset unit 110 to the digital TV 100, a bus reset can be automatically generated when a prescribed value is reached by the number of disconnection trials of an input plug and output plug, or when a prescribed threshold value is exceeded by a total amount of unreleased bandwidths or a total number of unreleased channel numbers and a prescribed threshold value is reached by the number of release trials of a bandwidth and a channel number.

The bus reset unit 110, when having generated a bus reset, immediately thereafter, performs a restoring operation for a connection having been established prior to bus reset generation. Since while a connection is disconnected on generation of bus reset, a restoring operation is performed thereafter, a data transfer intended by a user is not failed. Since restoration has a chance to end in failure, a necessity arises for avoiding generation of a bus reset more than necessary. Therefore, it is also recommended that the above threshold values are used as configuration information and freely altered according a usage environment of the digital TV 100 to thereby suppress the number of generated bus resets.

For example, the threshold values are commonly set high. When a recording reservation for a program is made, the bus reset unit 110, if a recording start time point draws near, lowers the threshold value to thereby relax a condition for generating a bus reset in order to establish a connection as soon as possible between the digital TV 100 and the D-VHS 200. Only in a case where no bandwidth necessary for transferring a program for which a reservation has been made can allocate, the bus reset unit 110 generates a bus resetting in order to suppress the number of bus resets.

A threshold value setting unit 112 and a bandwidth threshold value setting unit 113 are installed to the digital TV 100 as shown in FIG. 1 in order to alter threshold values according to a recording start time point and furthermore to suppress the number of generated bus resets.

The image recording application 102 notifies the bandwidth threshold value setting unit 113 of attribute information on the earliest program in recording start time point among the programs for which recording reservation has been made. The attribute information is, for example, information indicating whether an image quality of the program is for a high definition or standard television set.

Figure 7:
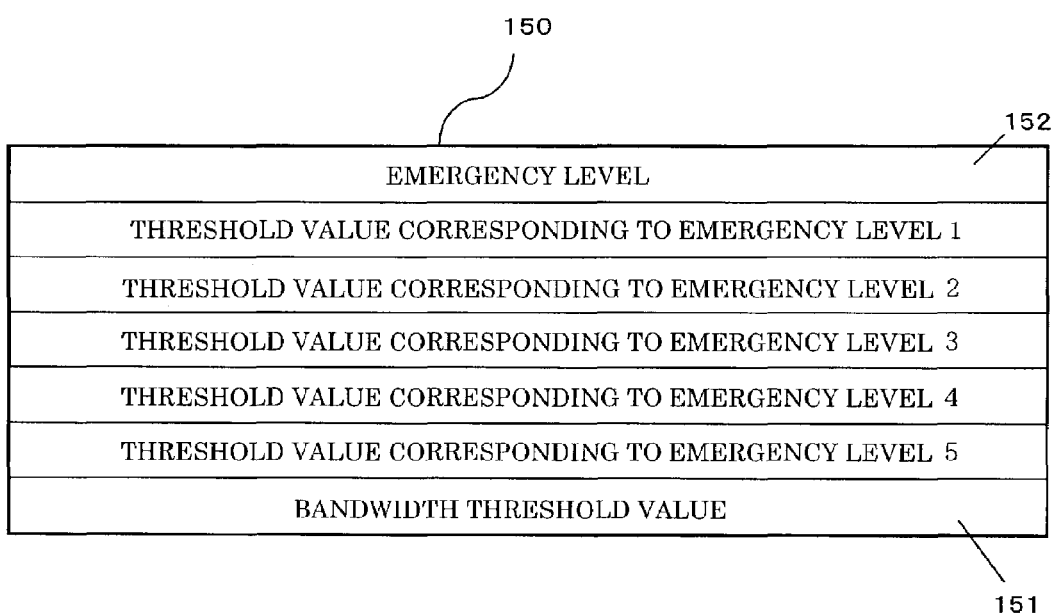
FIG. 7 is a conceptual diagram of a configuration table.

The bandwidth threshold value setting unit 113 calculates a bandwidth necessary for transferring the program from attribute information notified from the image recording application 102 using an equation defined in the IEC 61883-1. The bandwidth threshold value setting unit 113 writes a value obtained by subtracting the calculated bandwidth from the maximum band width of the 1394 bus into a configuration table 150 shown in FIG. 7 stored in configuration information a storage unit 114 as a bandwidth threshold value 151 (FIG. 8, S801).

The image recording application 102 notifies the threshold value setting unit 112 of a time difference between a recording start time point of the earliest program in recording start time point and a current time point.

Figure 8:
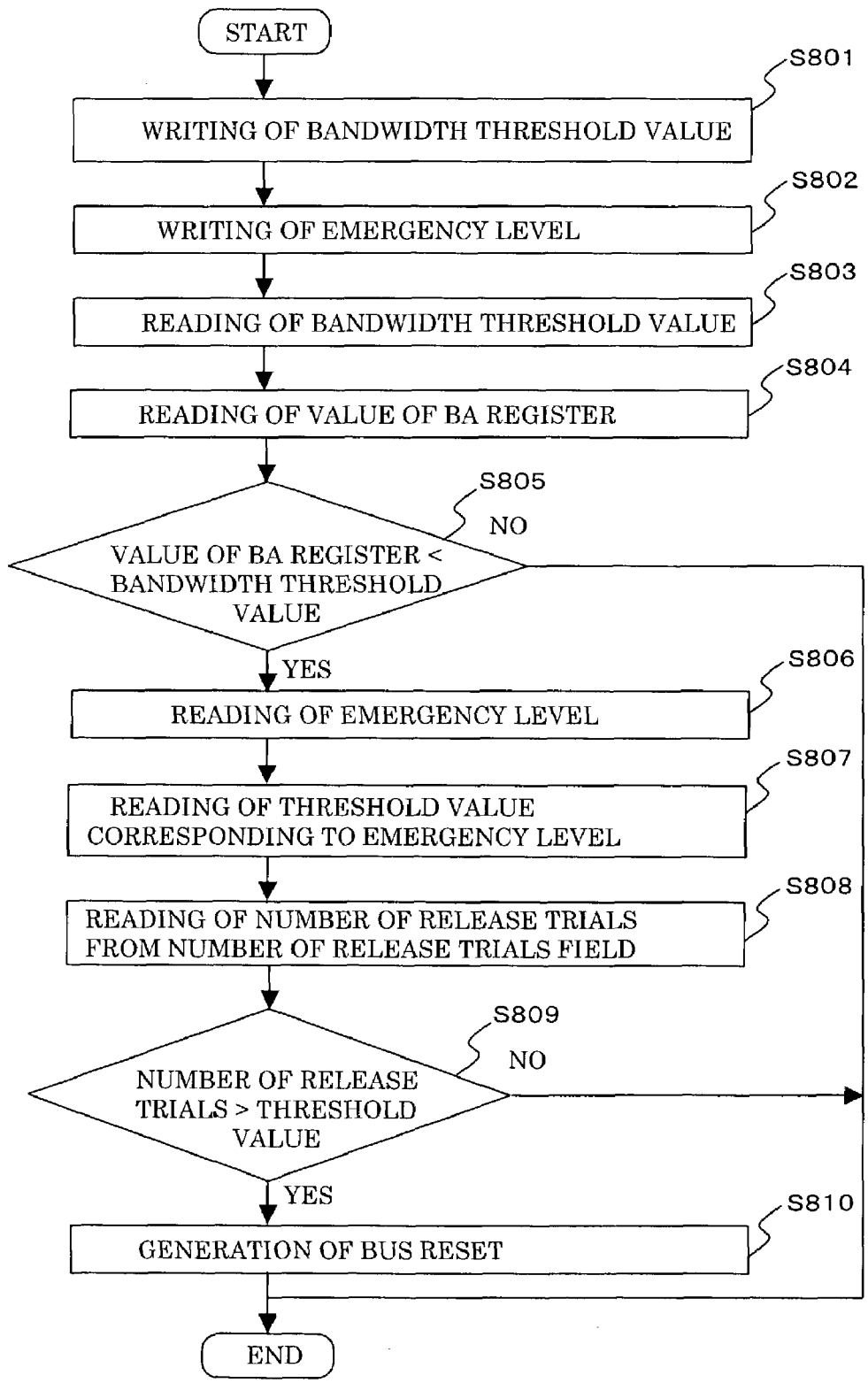
FIG. 8 is a flowchart showing a procedure for bus reset generation.

The threshold value setting unit 112, when having been notified of the time difference, writes an emergency level 152 on the basis of the time difference into the configuration table 150 (FIG. 8, S802). In this embodiment, the emergency levels are classified into 1 to 5 levels, where a level 5 is the highest in emergency, and the threshold value setting unit 112 writes a higher emergency level in a case of a smaller time difference.

A bandwidth threshold value 151 of the configuration table 150 is read by the bus reset unit 110 (FIG. 8, S803). The bus reset unit 110 reads a bandwidth not used for establishment of a connection from a BA register to compare the bandwidth value with the bandwidth threshold value 151 (FIG. 8, S804→S805).

When the bandwidth threshold value is small, that is when a bandwidth necessary for transferring program data is secured, the bus reset unit 110 terminates a determination processing on the bus reset without generating a bus reset (FIG. 8, S805→end).

In a case where a bandwidth necessary for transferring program data can be secured in this way, the number of generated bus resets can be suppressed without generating a bus reset.

When the band width threshold value 151 is large, that is when a bandwidth necessary for transferring program data cannot be secured, the bus reset unit 110 reads an emergency level 152 in the configuration table 150 (FIG. 8, S806).

The threshold values corresponding to the emergency levels 1 to 5 are written in advance in the configuration table 150, wherein a higher emergency level corresponds to a smaller threshold value.

The bus reset unit 110, when having read the emergency level, reads a threshold value corresponding to the emergency level 152 from the configuration table 150 (FIG. 8, S807). The bus reset unit 110, when having read the threshold value, reads the number of release trials from the number of release trials field 143 of the resource table 140 (FIG. 8, S808). The bus reset unit 110, when the number of release trials exceeds the threshold value, generates a bus reset (FIG. 8, S809→S810).

The bus reset unit 110, when the number of release trials is smaller than the threshold value, terminates a determination processing on bus reset without generating a bus reset (FIG. 8, S809→end).

In such a way, a condition for generating a bus reset can be relaxed by decreasing the threshold value as the recording time start point draws near.

Note that while in the above description, an emergency level is determined on the basis of a time difference between a recording start time point and a current time point, an emergency level may be determined on the basis of, for example, the number of digital devices connected to the 1394 bus. This is because with increase in the number of digital data processing devices connected, a higher possibility arises that establishment of connections and disconnections on the 1394 bus are concentrated at one time, thereby increasing a possibility of no normal disconnection of connections.

While in the above description, the bandwidth threshold setting unit 113 sets a bandwidth threshold value on the basis of an attribute of a program, the threshold value setting unit 112 may set a bandwidth threshold value on the basis of an emergency level.

Figure 10:
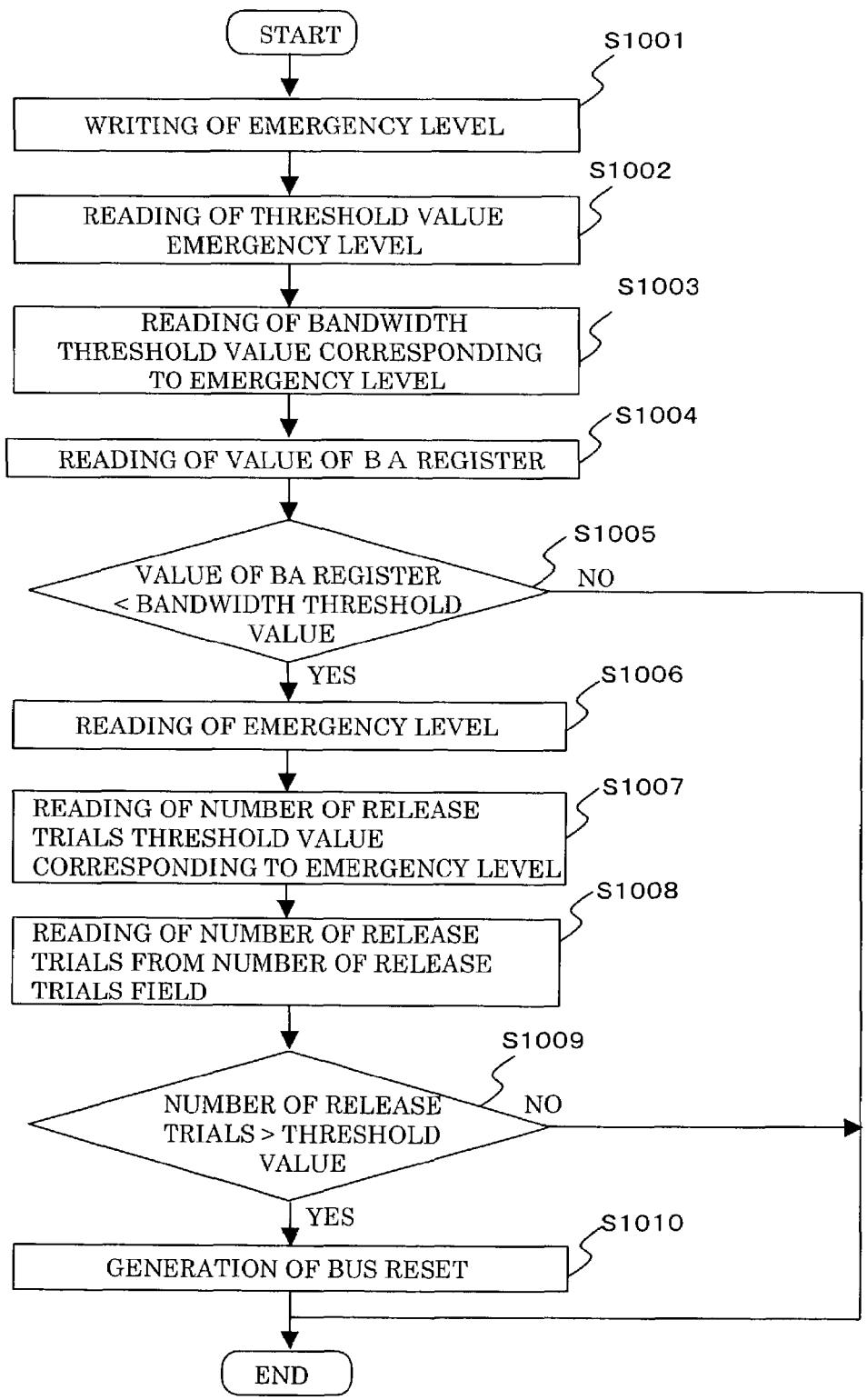
FIG. 10 is a flowchart showing a procedure for bus reset generation.

The threshold value setting unit 112 writes an emergency level 152 into the configuration information 150 as described above when having been notified of a time difference between a recording start time point and a current time point from the image recording application (FIG. 10, S1001).

Figure 9:
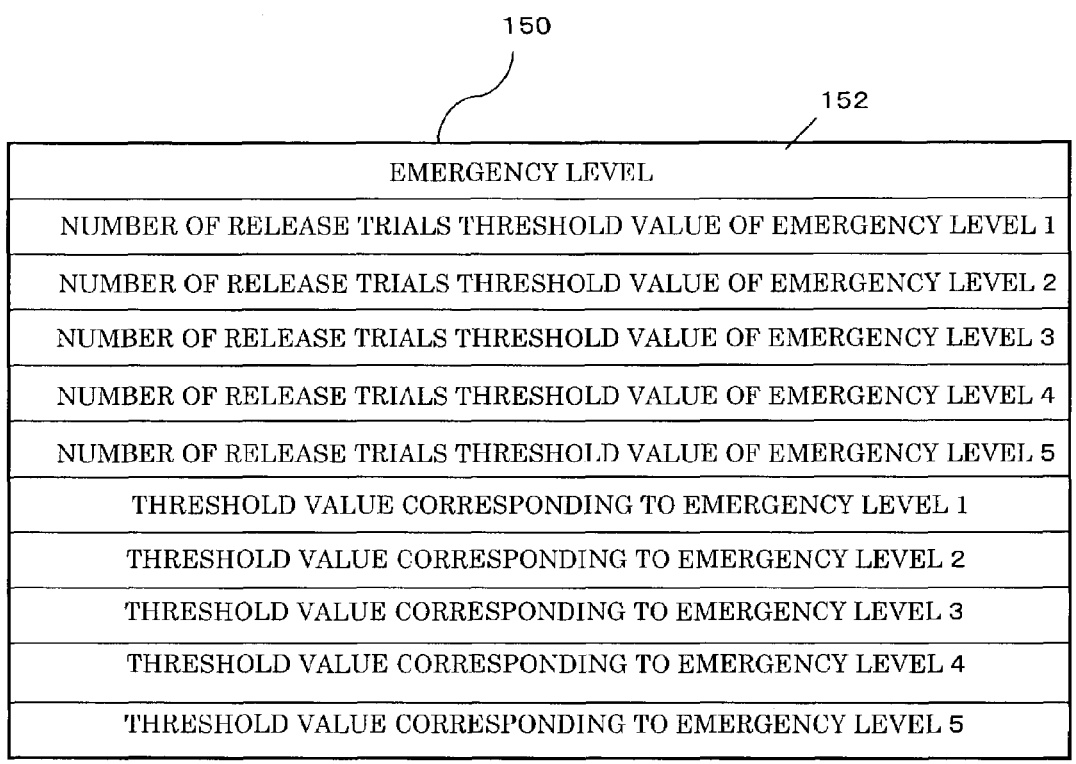
FIG. 9 is a conceptual diagram of a configuration table.

Threshold values and bandwidth threshold values corresponding to emergency levels 1 to 5 are written in the configuration information 150 here as shown in FIG. 9 in advance and at a higher emergency level, a threshold value and a bandwidth threshold value becomes smaller.

An emergency level 152 of the configuration information 150 is monitored by the bus reset unit 110 and the bus reset unit 110, when an emergency level 152 has been written into the configuration information 150, reads an emergency level 152 and reads a bandwidth threshold value of the emergency level from the configuration information 150 (FIG. 10, S1002→S1003).

The bus reset unit 110 reads a bandwidth not used for establishment of a connection from the BA register to compare the bandwidth with a bandwidth threshold value read from the configuration information (FIG. 10, S1004→S1005).

The bus reset unit 110 terminates a determination processing on a bus reset without generating a bus reset when a band width threshold value read from the configuration information 150 is small (FIG. 10, S1005→end).

The bus reset unit 110 reads an emergency level of the configuration table 150 once more when a bandwidth threshold value read from the configuration information 150 is large (FIG. 10, S1006).

The bus reset unit 110, when having read the emergency level, reads a threshold value corresponding to the emergency level 152 from the configuration table 150 (FIG. 10, S1007). The bus reset unit 110, when having read the threshold value, reads the number of release trials from the number of release trials field 143 of the resource table 140 (FIG. 10, S1008). The bus reset unit 110, when the number of release trials exceeds the threshold value, generates a bus reset (FIG. 10, S1009→S1010).

The bus reset unit 110, when the number of release trials is smaller than the threshold value, terminates determination processing on a bas reset without generating a bus reset.

(Second Embodiment)

When the D-VHS 200 and the IRM performs communication with other devices while the disconnection trial unit 109 is in disconnection process of an input plug and output plug or in release process of a resource, the D-VHS 200 and the IRM cannot receive the update request and release request. This communication is an asynchronous transaction used in asynchronous communication of data.

In the second embodiment here, description will be given of a method in which an asynchronous transaction detecting unit 111 is installed to the digital TV 100 and when neither of the D-VHS 200 or the IRM performs an asynchronous transaction, the disconnection instructing unit 107 transmits the disconnection request to the disconnection trial unit 109.

Figure 11:
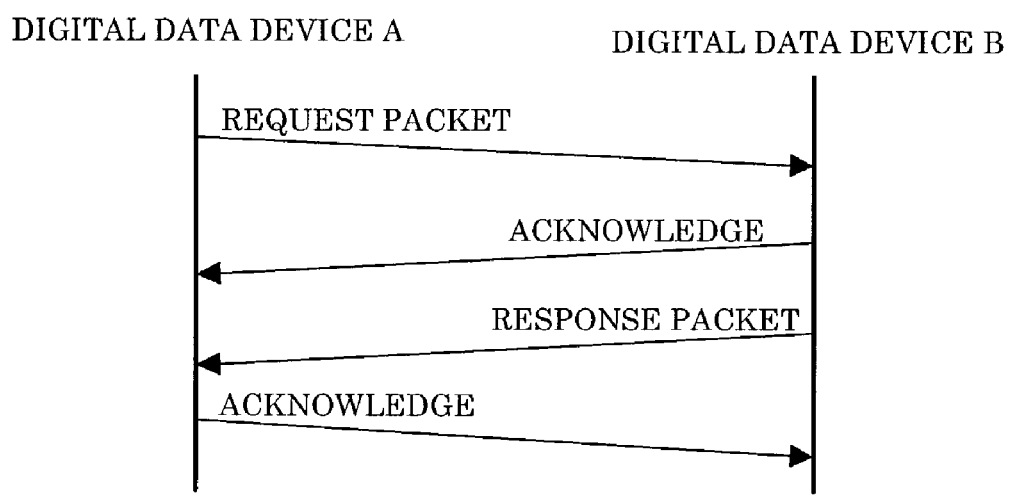
FIG. 11 is a conceptual diagram of an asynchronous transaction.

FIG. 11 shows a flow of data when digital data processing devices perform an asynchronous transaction with each other. As shown in FIG. 11, when a digital data processing device A at first transmits a request packet to a digital data processing device B (D-VHS 200 or the IRM), the digital data processing device B receives the request packet and, transmit an acknowledge to notify of reception of the request packet to the digital data processing device A.

Then, the digital data processing device B, when having performed a processing according to the request packet, transmits a response packet to the effect that the processing has been completed to the digital data processing device A. The digital data processing device A, when receiving the response packet, transmits an acknowledge to notify of reception of the response packet to the digital data processing device B.

The digital data processing device B, as described above, receives an asynchronous packet, updating of the CA register, the BA register or the like during a time between reception of the request packet and transmission of the response packet. Therefore, a case arises where, during the time, the D-VHS 200 or the IRM cannot receive an update request of the "iPCR", or a release request for the bandwidth or channel number.

Therefore, the asynchronous transaction detecting unit 111, when the disconnection instructing unit 107 has activated the disconnection instruction timer 108, reads the iPCR or oPCR flag field 129 or 130 of the non-disconnected connection table 120 registered at the storage unit 106.

The asynchronous transaction detecting unit 111, when having detected a non-disconnected connection table in which a value of the iPCR or oPCR flag field is "1," allocates an input/output node ID having been written into the non-disconnected connection table. The asynchronous transaction detecting unit 111, when having allocated the input/output node ID, detects a digital data processing device with the node ID (hereinafter referred to as a "monitored device") and an asynchronous transaction performed by the IRM (FIG. 12, S1201).

Figure 12:
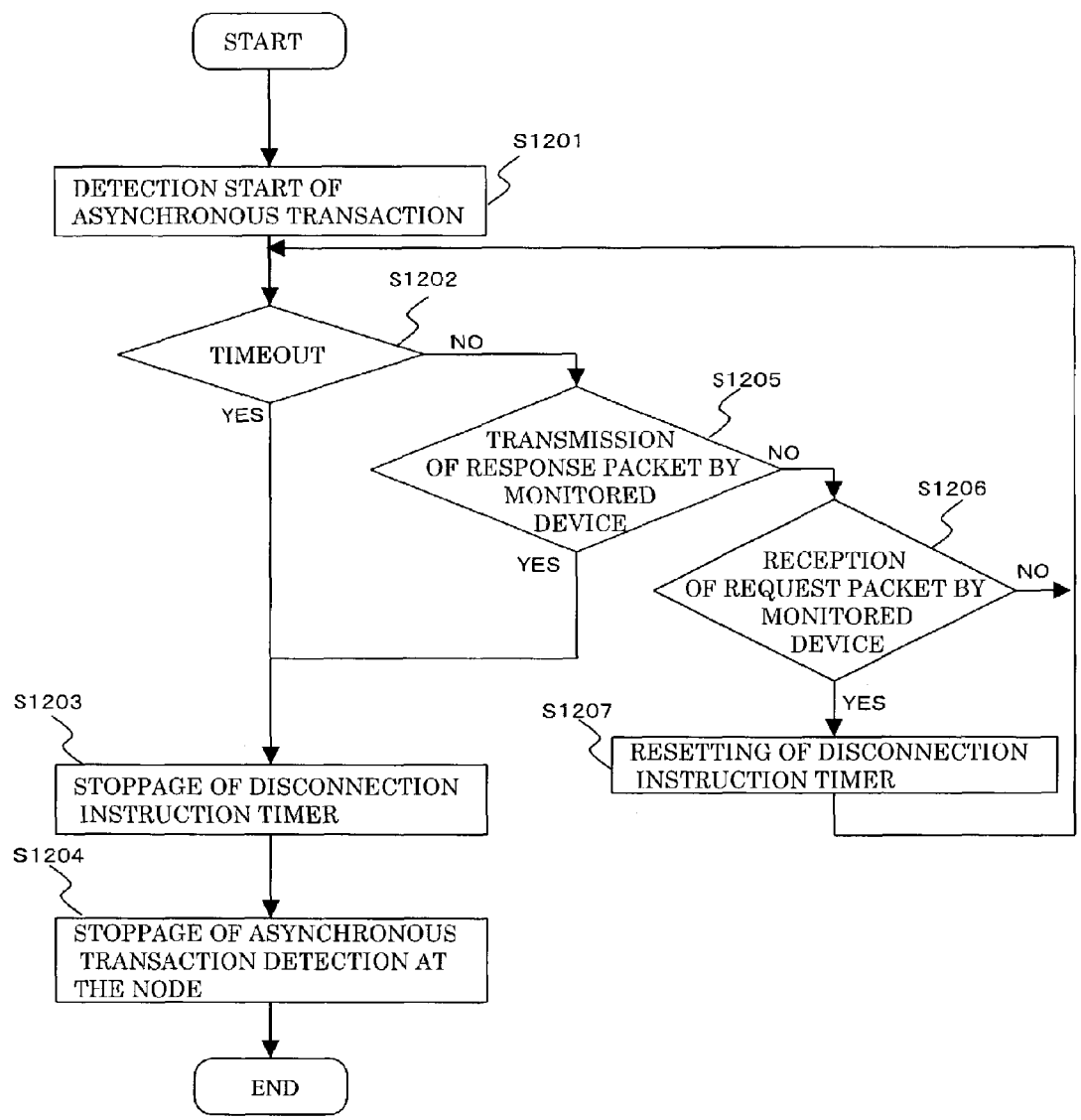
FIG. 12 is a flowchart showing a monitoring procedure for an asynchronous transaction in an embodiment of the present invention.

In a case where an acknowledge and a response packet shown in FIG. 11 are not transmitted from the monitored device or an IRM by the time point when a timeout occurs in the disconnection instruction timer 108 after being activated, the asynchronous transaction detecting unit 111 regards the monitored device as a device not to perform an asynchronous transaction (FIG. 12, S1202). The asynchronous transaction detecting unit 111 stops detection of the disconnection instruction timer 108 and an asynchronous transaction (FIG. 12, S1203→S1204). The disconnection instructing unit 107, when the disconnection instruction timer 108 stops its operation, transmits a disconnection request to the disconnection trial unit 109 as described in the first embodiment.

The disconnection trial unit 109 having received the disconnection request, as described in the first embodiment, performs a disconnection processing for an input plug and output plug, and a release processing for a resource.

When having detected that the monitored device or the IRM has transmitted a response packet prior to occurrence of its timeout in the disconnection instruction timer 108, the asynchronous transaction detecting unit 111 regards the monitored device and an asynchronous transaction as ones to be completed. The asynchronous transaction detecting unit 111 stops the disconnection instruction timers 108 and further stops detection of an asynchronous transaction (FIG. 12, S1202→S1205→S1203→S1204). The disconnection instructing unit 107 transmits a disconnection request to the disconnection trial unit 109.

In a case where the asynchronous transaction detecting unit 111 has detected that the monitored device or the IRM receives a request packet transmitted from a prescribed digital data processing device and transmits an acknowledge prior to transmission of a response packet, the asynchronous transaction detecting unit 111 resets the disconnection instruction timer 108 (FIG. 12, S1206→S1207).

By resetting the disconnection instruction timer 108 in this way, a possibility is lowered that a timeout occurs in the disconnection instruction timer 108 by the time point when the monitored device or the IRM transmits a response packet. If a possibility of occurrence of a timeout is lowered, a possibility is lowered that the disconnection instructing unit 107 transmits a disconnection request to the disconnection trial unit 109 by the time point when the monitored device or the IRM transmits a response packet. Accordingly, a possibility is raised that the monitored device receives an update request for an "iPCR" or "oPCR" and the IRM receives a release request for a bandwidth or a channel number.

(Third Embodiment)

Disconnection of a connection, as described above, is performed in the order of steps of updating of an "iPCR," updating of an "oPCR," a release of a bandwidth and a release of a channel number. Therefore, a case arises where when an IRM is in communication with another device during a release of a channel number, an anomaly of resources has a chance to occur that all the channel numbers are not in a released state despite of all the bandwidth of the 1394 bus in a released state.

With a malfunction of the IRM occurring, a case arises where the IRM transmits a response of release completion of the bandwidth to the connection control unit 105 and the disconnection trial unit 109 without updating the BA register. In that case, the IRM has a chance to update the CA register without updating the BA register. Then, an anomaly of resources has a chance to occur that all the bandwidth of the 1394 bus are not in a released state despite of all the channel numbers of the 1394 bus in a released state.

Furthermore, a case arises where the connection control unit 105 and the disconnection trial unit 109 perform malfunctions and updates a value of the oPCR flag field 130 to 0 without updating the region A13 of an "oPCR". In that case, all of the resources of the 1394 bus have a chance to be released without updating the region A13 of the "oPCR".

Therefore, a case arises where, though values of both the regions A12 and A13 of the "oPCR" are not 0, that is though the "oPCR" indicates that a connection has been established to the output plug 103 controlled by the "oPCR", a value of the CA register corresponding to a channel number of the region A14 of the "oPCR" is "1". Furthermore, in this case, a chance arises where a value of the BA register is of all the bandwidth of the 1394 bus and a value indicated by the BA register indicate an anomaly that all the bandwidth of the 1394 bus is in a released state.

Likewise, an anomalous case arises where though an "iPCR" exists that both values of the regions A22 and A23 of the "iPCR" are 0 and, a value of the CA register corresponding to a channel number of a region A24 of the "iPCR" is "1", or occurs where a value of the BA register is all the bandwidth of the 1394 bus.

Therefore, the bus reset unit 110 generates a bus reset in the following way to eliminate the anomalies in a case where the anomalies are not eliminated.

The bus reset unit 110 refers to the BA register and the CA register at intervals of a prescribe time and monitors whether or not there exists a resource in an anomalous state as described above (FIG. 13, S1301→S1302).

Figure 13:
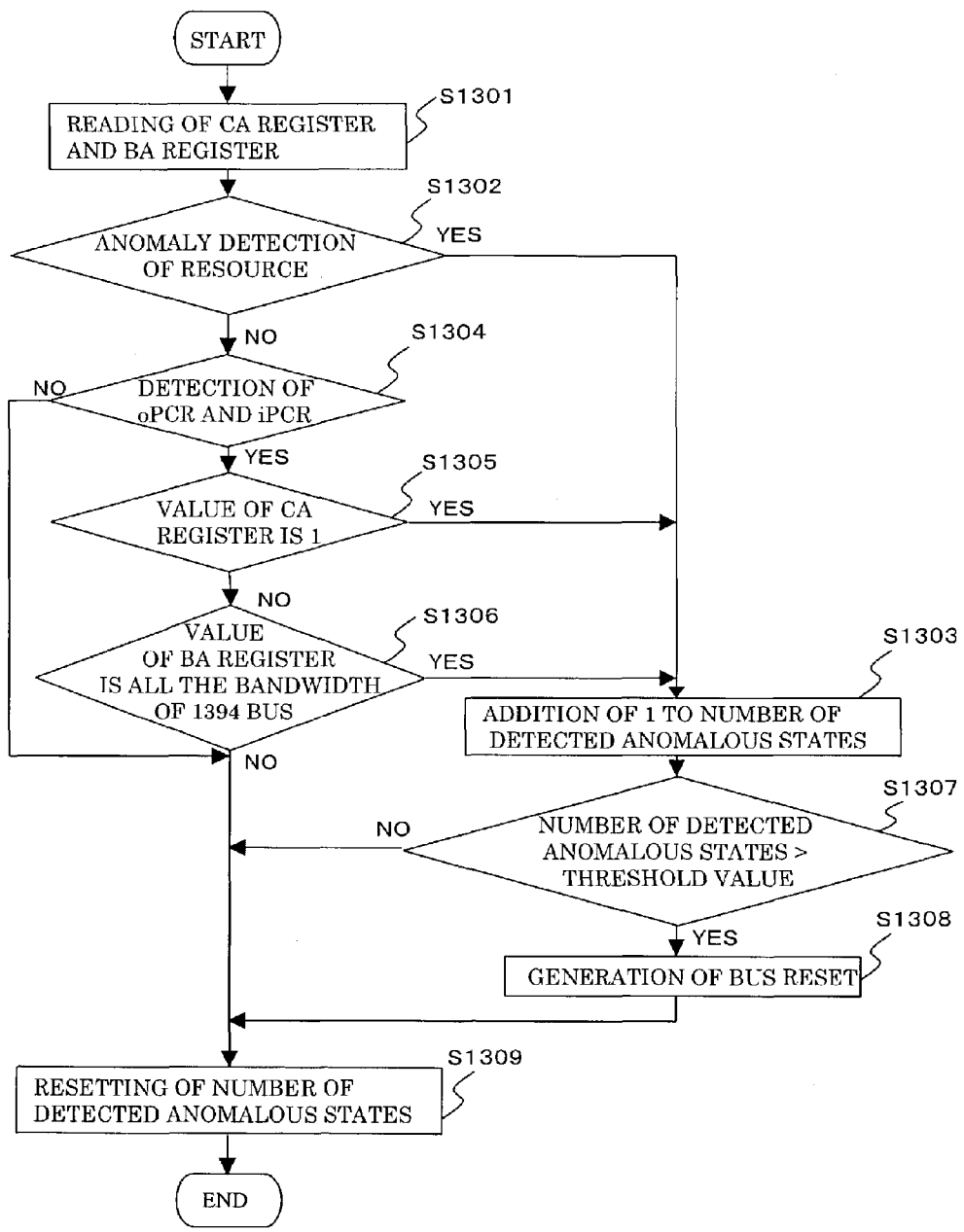
FIG. 13 is a flowchart showing a procedure for bus reset generation when an abnormal state is detected.

The bus reset unit 110 when having detected an anomaly of a resource, adds 1 to the number of detected anomalous states held by the bus reset unit 110 (FIG. 13, S1303).

The bus reset 110, when not being able to detect an anomalous state of a resource, reads regions A12 and A13 of the "oPCRs" of all of the digital data processing devices connected to the 1394 bus to detect an "oPCR" in which both of the regions A12 and A13 are not 0 (FIG. 13, S1304).

The bus reset unit 110, when having detected an "oPCR" in which both of the regions A12 and A13 are not 0, reads a channel number of a region A14 of the "oPCR" to confirm whether or not a value of the CA register corresponding to the channel number is "1" (FIG. 13, S1305).

When a value of the CA register is "1," the bus reset unit 110 adds 1 to the number of detected anomalous states (FIG. 13, S1303).

Likewise, the bus reset unit 110 detects an "iPCRs among the "iPCRs of all the digital data processing devices in which both of the regions A22 and A23 are not 0 to confirm a value of the CA register corresponding to a channel number of the region A24 of the "iPCR" is "1". When a value of the CA register is "1", the bus reset unit 110 adds 1 to the number of detected anomalous states (FIG. 13, S1303).

The bus reset unit 110, when a value of the CA register is "0", refers to the BA register to then, confirm whether or not a value of the BA register is all the bandwidth of the 1394 bus (FIG. 13, S1306).

When a value of the BA register is all the bandwidth of the 1394 bus, the bus reset unit 110 adds 1 to the number of detected anomalous states as described above (FIG. 13, S1303).

The bus reset unit 110 generates a bus reset, when the number of detected anomalous states reaches a prescribed threshold value (FIG. 13, S1307→S1308). The bus reset unit 110 resets the number of detected anomalous states when having generated a bus reset (FIG. 13. S1309).

The bus reset unit 110 resets the number of detected anomalous states without generating a bus reset in a case where no detection is made of an "oPCR" and an "iPCR" in which the regions A12 and A13 or the regions A22 and A23 both are not 0 in step 1104, and in a case where a BA register does not become a value of all the bandwidth of the 1394 bus (FIG. 13, S1309). The reason why the number of detected anomalous states is reset is that since establishment of a connection and a disconnection are performed asynchronously, a case arises where the bus reset unit 110 recognizes being performed in an anomalous state though the disconnection is normally performed.

For example, immediately after a release of a bandwidth of a connection between prescribed devices, a channel number is not in an unreleased state though the input plugs and output plugs have been released. Therefore, the bus reset unit 110, at this time, when performing detection of an anomalous state, recognizes generation of an anomalous state though disconnection of a connection is normally performed to add 1 to the number of detected anomalous states (FIG. 13, S1305→S1303).

Therefore, when no anomalous state can be detected in a processing for detection of an anomaly, the bus reset unit 110 resets the number of detected anomalous states.

With the above procedure adopted, the bus reset unit 110 generates a bus reset to eliminate an anomalous state if having detected several anomalous cases where matching is lost between an "iPCR", an "oPCR", a CA register and a BA register.

(Effect of the Invention)

According to the present invention, even in a case where the system falls in inconvenient states where neither disconnection of an input plug and output plug nor release of a resource can be performed before a user becomes aware thereof, a bus reset is automatically generated to restore an "iPCR", an "oPCR", a BA register and a CA register to respective initial states, thereby enabling establishment of a new connection between an input plug and output plug.

By monitoring an asynchronous transaction of a digital data processing device, to which a connection has been established, and which is an object of disconnection, a disconnection trial is performed when the digital data processing device performs no asynchronous transaction to thereby raise a probability to succeed in disconnection of a connection. Therefore, disconnection of an input plug and output pug, and release of a resource can be quickly performed in a normal way.

Information on an unreleased channel number and an unreleased bandwidth are managed in a resource table and when a total amount of an unreleased bandwidth or a total number of channel numbers reach respective prescribed threshold values, release processings for a bandwidth and a channel number are performed. Therefore, an effect is exerted that when an unreleased bandwidth and channel numbers amount to respective some amount or numbers, the disconnection instructing unit transmits a release request for a resource to an IRM to thereby not only reduce the number of transmitted release requests, but also quickly restore a resource to a normal state.

By altering a threshold value serving as a criterion in generating a bus reset according to a emergency level of a bus reset, the threshold value is lowered only at high level of emergency, thereby generating a bus reset with ease. When a level of emergency is low, the threshold value is set high, thereby enabling reduction in the number of generated bus resets at a low level of emergency.

By generating a bus reset only when a condition is met that a bandwidth necessary for transferring data cannot be secured, the number of generated bus resets can be reduced.

What is claimed is:

1. A digital data processing device allocate resources of a bus and establishing a connection between the device and an other device connected by the bus, comprising:
   a storage unit operable to store connection information on the connection having been established;
   a disconnection instructing unit operable to generate a disconnection request for a prescribed connection;
   a disconnection trial unit operable to perform release of a resource used in the prescribed connection as a trial in response to the disconnection request, while writing the number of release trials in failure of release of a resource and a resource amount in failure of release into the connection information; and
   a bus reset unit operable to reset the bus in a case where the number of release trials and the resource amount having been stored into the storage unit reach respective prescribed threshold values.

2. A digital data processing device according to claim 1, wherein
   the resource amount includes at least one of the number of unreleased channels and a bandwidth.

3. A digital data processing device according to claim 1, further comprising:
   an asynchronous transaction detecting unit operable to detect an asynchronous transaction performed by a prescribed digital data processing device connected to a connection, wherein
   the disconnection instructing unit transmits a disconnection request to the disconnection trial unit on the basis of a detection result of an asynchronous transaction by the asynchronous transaction detecting unit instead of transmitting a disconnection request to the disconnection trial unit.

4. A digital data processing device according to claim 3, wherein
   the asynchronous transaction is reception of a request packet, and the disconnection trial unit transmits a disconnection request when a prescribed time elapses after detection of the request packet.

5. A digital data processing device according to claim 3, wherein
   the asynchronous transaction is transmission of a response packet, and the disconnection trial unit transmits a disconnection request when the transmission of a request packet is detected.

6. A digital data processing device according to claim 1, further comprising:
   a threshold value setting unit operable to set the threshold value on the basis of an emergency level of establishment of a connection that dynamically changes.

7. A digital data processing device according to claim 1, further comprising:
   a bandwidth threshold value setting unit operable to set the resource amount on the basis of a bandwidth necessary for transferring data in a connection to be newly established and a bandwidth already used in a connection having been established.

8. A bus controlling method of controlling a bus with respect to a disconnection request for a connection having been established between digital data processing devices with resources of the bus allocated by the digital data processing devices connected by the bus, the method comprising:
   a disconnection trial step of performing release of resources used for the prescribed connection having been established with respect to a disconnection request for the connection, while writing a release situation of the resources into a storage unit operable to store connection information on the connection; and
   a bus reset step of resetting the bus on the basis of the release situation of the resources.

9. A computer program product embodied on a computer readable data storage medium for use with a compter for controlling controlling a bus with respect to a disconnection request for a connection having been established between digital data processing devices with resources of the bus allocated by the digital data processing devices connected by the bus, said computer program product comprising:
- a disconnection trial program code operable to perform release of resources used for the prescribed connection having been established with respect to a disconnection request for the connection, while writing a release situation of the resources into a storage unit operable to store connection information on the connection; and
- a bus reset program code operable to reset the bus on the basis of the release situation of the resources.

10. A computer-readable recording medium having recorded a bus controlling program of controlling a bus with respect to a disconnection request for a connection having been established between digital data processing devices with resources of the bus allocated by the digital data processing devices connected by the bus, and for causing a computer to execute a method comprising:
- a disconnection trial step of performing release of resources used for the prescribed connection having been established with respect to a disconnection request for the connection, while writing a release situation of the resources into a storage unit operable to store connection information on the connection; and
- a bus reset step of resetting the bus on the basis of the release situation of the resources.

* * * * *

UNITED STATES PATENT AND TRADEMARK OFFICE
CERTIFICATE OF CORRECTION

PATENT NO. : 6,985,979 B2
APPLICATION NO. : 10/318265
DATED : January 10, 2006
INVENTOR(S) : Tetsuo Kagawa et al.

It is certified that error appears in the above-identified patent and that said Letters Patent is hereby corrected as shown below:

Column 20, line 40, change "request packet" to -- response packet --;
Column 21, line 3, delete the first instance of "controlling".

Signed and Sealed this

Eighth Day of August, 2006

JON W. DUDAS
*Director of the United States Patent and Trademark Office*